United States Patent [19]

Kuriyama

[11] Patent Number: 5,005,967
[45] Date of Patent: Apr. 9, 1991

[54] MICROFILM IMAGE PROCESSING APPARATUS HAVING AUTOMATIC FOCUS CONTROL CAPABILITIES

[75] Inventor: Masaaki Kuriyama, Osaka, Japan

[73] Assignee: Minolta Camera Kabushiki Kaisha, Osaka, Japan

[21] Appl. No.: 374,295

[22] Filed: Jun. 29, 1989

[30] Foreign Application Priority Data

Jul. 1, 1988 [JP] Japan ................................ 63-165583
Jul. 1, 1988 [JP] Japan ................................ 63-165584

[51] Int. Cl.⁵ .......................... G03B 21/53; G03B 27/34
[52] U.S. Cl. ..................................... 353/101; 353/122; 353/76; 352/140
[58] Field of Search .......................... 353/101, 122, 76; 355/55, 56, 61; 352/140; 356/444

[56] References Cited

U.S. PATENT DOCUMENTS

| 4,010,479 | 3/1977 | Nobusawa | 352/140 |
| 4,156,563 | 5/1979 | Kato et al. | 352/140 |
| 4,163,611 | 8/1979 | Hall | 353/101 |
| 4,174,890 | 11/1979 | Johnson et al. | 353/101 |
| 4,268,135 | 5/1981 | Lehto | 353/101 |
| 4,386,833 | 6/1983 | Hirose | 353/101 |
| 4,415,244 | 11/1983 | Daly et al. | 355/56 |
| 4,762,985 | 8/1988 | Imai et al. | 356/444 |
| 4,789,880 | 12/1988 | Mori et al. | 355/55 |

FOREIGN PATENT DOCUMENTS

| 60-227241 | 11/1985 | Japan . |
| 62-105571 | 5/1987 | Japan . |
| 62-105574 | 5/1987 | Japan . |
| 62-108665 | 5/1987 | Japan . |
| 62-164031 | 7/1987 | Japan . |

Primary Examiner—William A. Cuchlinski, Jr.
Assistant Examiner—William C. Dowling
Attorney, Agent, or Firm—Price, Gess & Ubell

[57] ABSTRACT

A microfilm image reader apparatus for detecting an image on a microfilm strip and projecting the detected image onto a target plane, wherein a beam of light bearing an image detected from the microfilm strip is produced by illuminating the microfilm strip and is projected through a projection lens onto the target plane, and wherein an automatic mode of focus control is established through detection of a condition in which the image-bearing beam is focussed with respect to the target plane and, when it is detected that the automatic mode of focus control is inoperable, the projection lens is automatically moved to a position having its focal plane located on a predetermined plane with respect to the target plane and, after the projection lens is moved to such a position, the focal plane of the projection lens may be manually adjusted by the operator of the apparatus.

15 Claims, 20 Drawing Sheets

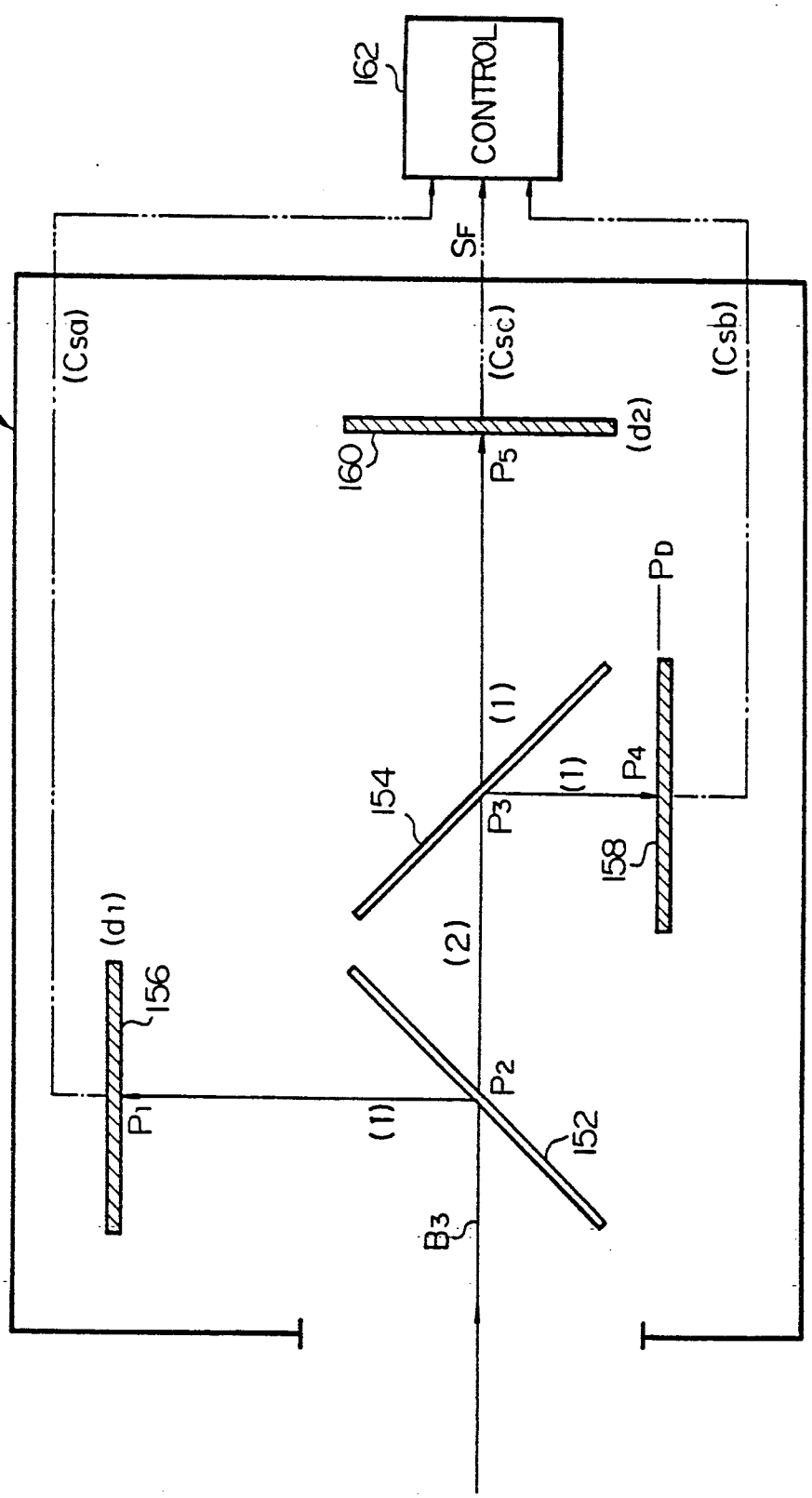

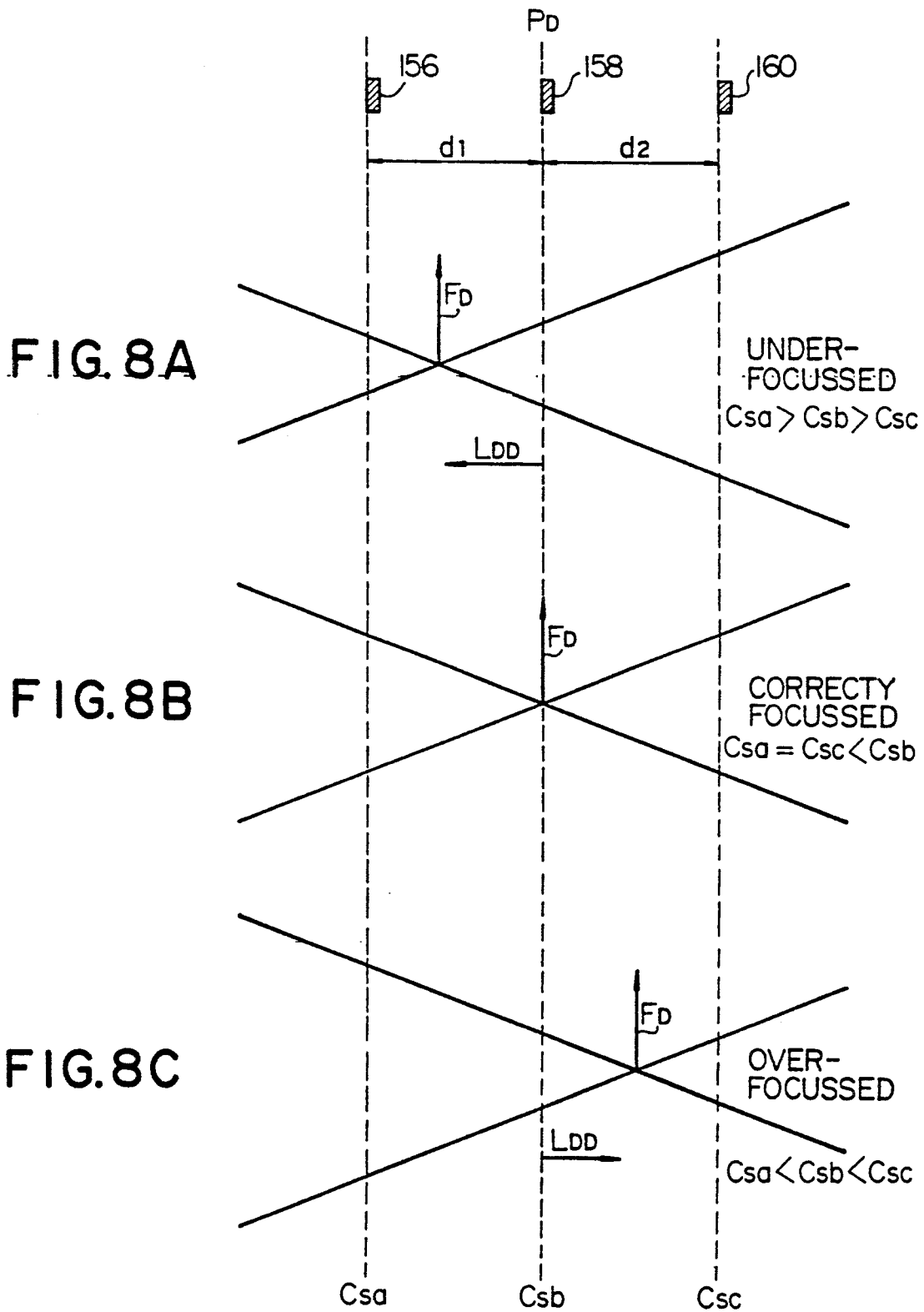

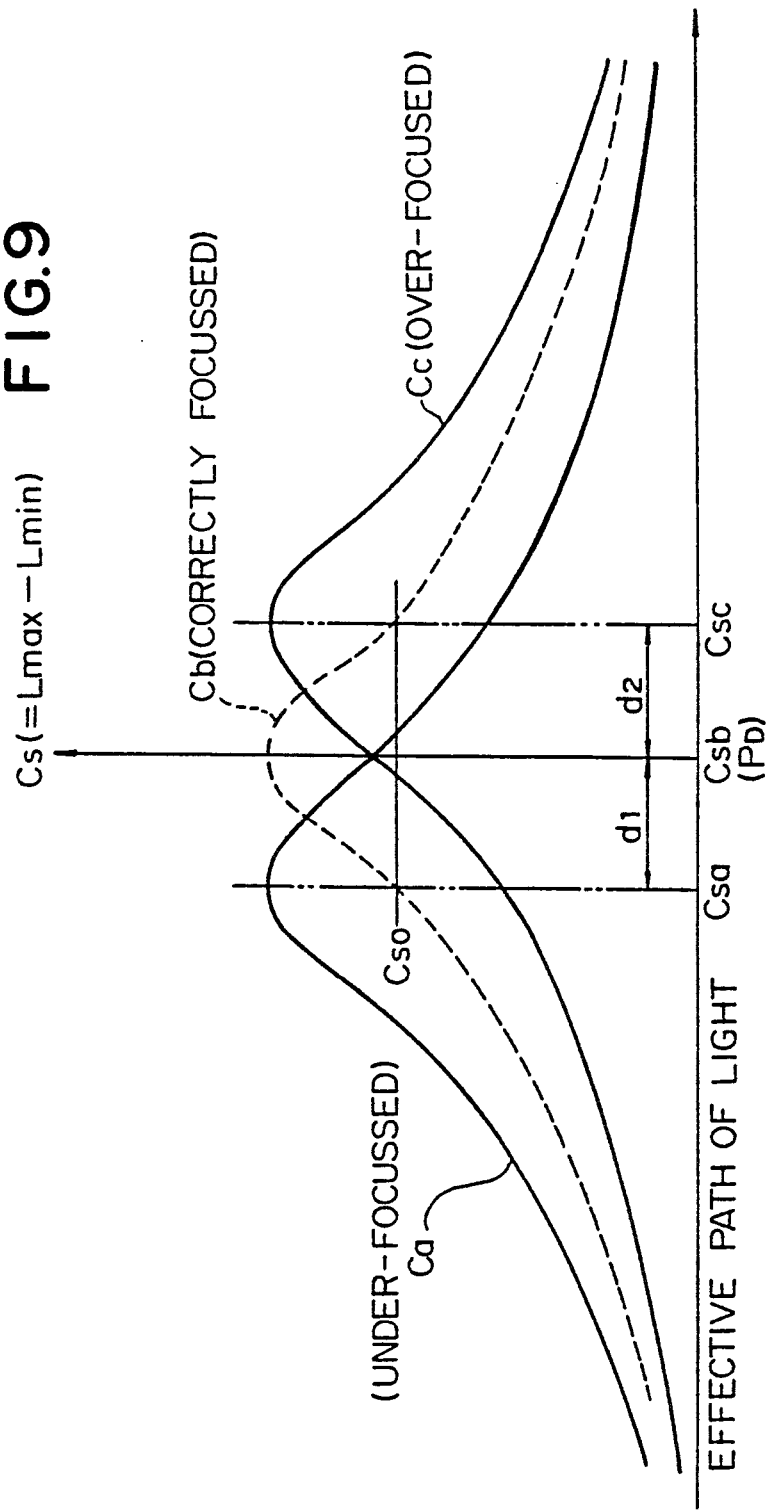

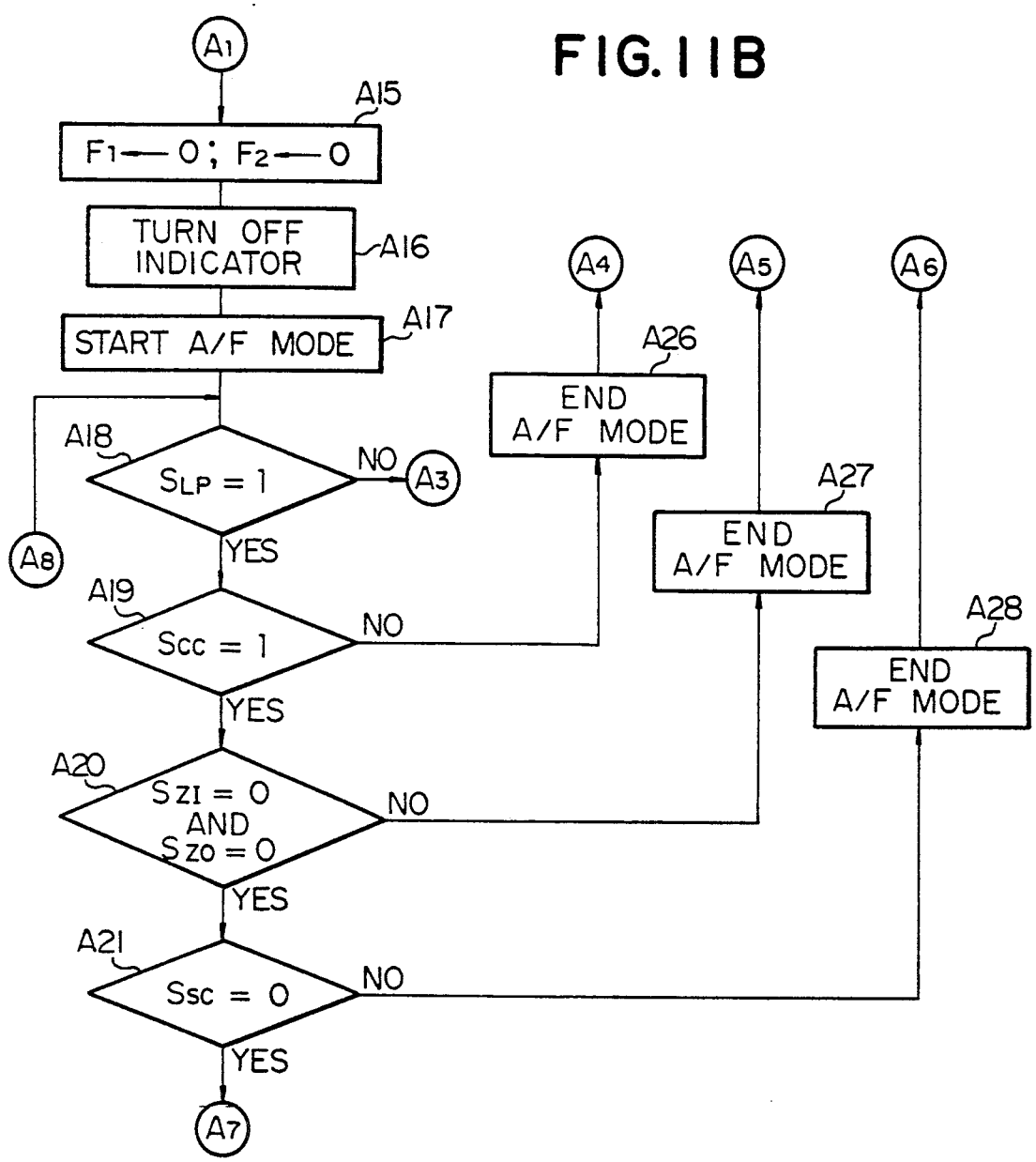

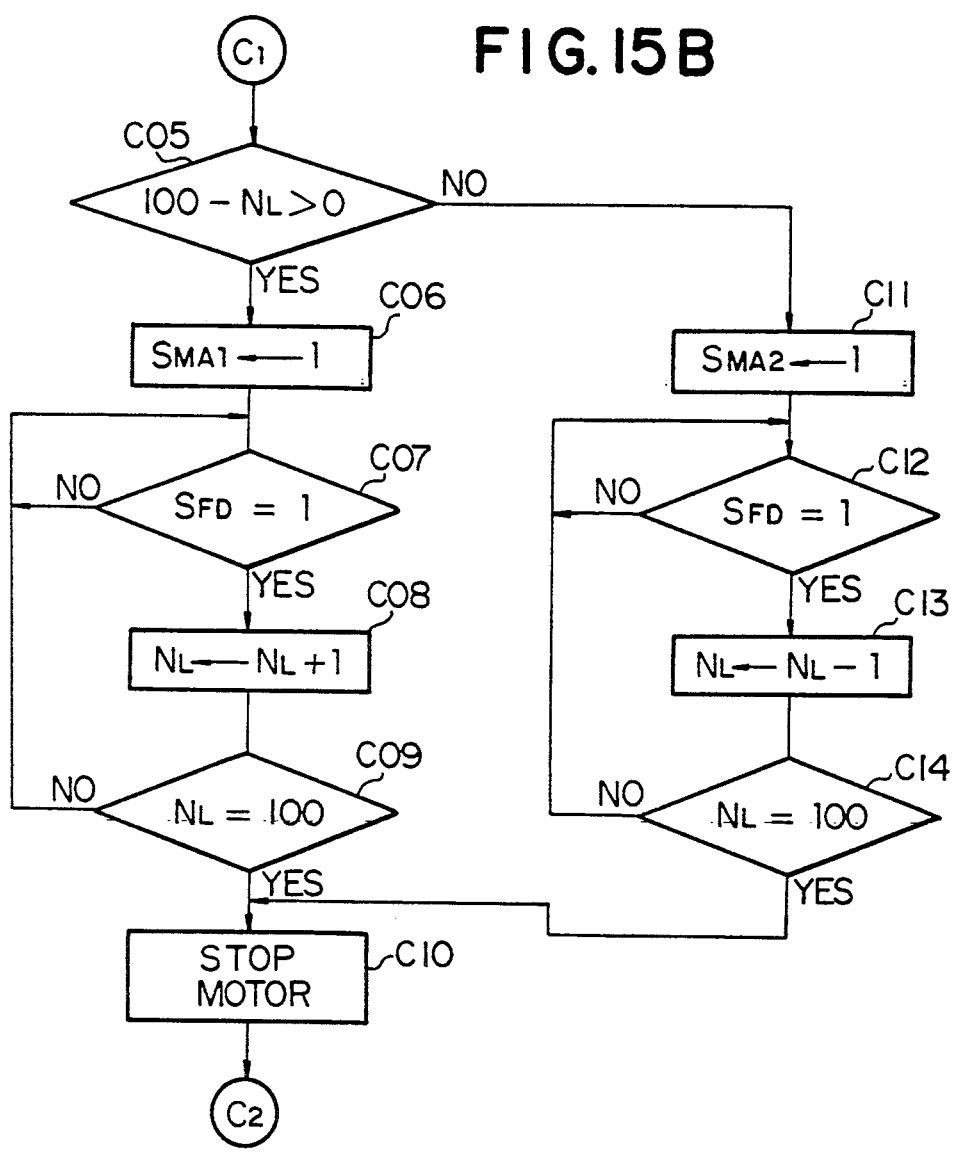

MICROFILM IMAGE PROCESSING APPARATUS HAVING AUTOMATIC FOCUS CONTROL CAPABILITIES

FIELD OF THE INVENTION

The present invention relates to a microfilm image processing apparatus such as a microfilm reader apparatus or a microfilm reader/printer apparatus having automatic focus control capabilities.

BACKGROUND OF THE INVENTION

In a microfilm image processing apparatus of the type to which the present invention generally appertains, a frame of image recorded on a microfilm strip is picked up by a beam of light passed through or reflected from the microfilm strip. The resultant image-bearing beam of light is projected to an enlarged scale on a viewing screen by means of a projection lens. Examples of such a microfilm image processing apparatus include a microfilm image reader apparatus which enables the user of the apparatus to view the image reproduced on a viewing screen and an apparatus which not only reproduces the detected image on a viewing screen but produces electric signals responsive to the image-bearing beam of light with use of, for example, an array of charge-coupled devices. Typical of the apparatus of the latter type is a combination microfilm reader/printer apparatus which is capable of not only reproducing the detected image on a viewing screen but producing a printed output of the image detected from the microfilm strip.

To pick up an image recorded on a microfilm strip in a microfilm image processing apparatus of any of these types, the microfilm strip is irradiated with a beam of light emanating from a suitable form of light source. The resultant image-bearing beam of light is projected to an enlarged scale on a viewing screen by means of a projection lens located intermediate between the microfilm strip and the viewing screen. If the microfilm strip and the projection lens are spaced apart a fixed distance from each other, the projection lens will have its focal plane fixedly located with respect to the microfilm strip and accordingly to a target plane defined by the viewing screen. In actuality, however, the distance between the microfilm strip and the projection lens is inevitably subject to variation due to, for example, localized deformation of the microfilm strip and because of the fact that the holder plates holding the microfilm strip in place with respect to the projection lens tend to incline from the plane perpendicular to the path of light. A change thus caused in the distance between the microfilm strip and the projection lens results in dislocation of the focal plane of the lens and accordingly in inability of the lens to produce a correctly focused image on the viewing screen.

In order that the image to be reproduced on the viewing screen is correctly focussed, the projection lens may be moved with respect to the microfilm strip by having recourse to manipulative steps. For this purpose, the operator of the apparatus will be required to control the position of the projection lens by manually operating a focus control switch or switches while carefully viewing the image reproduced on the viewing screen. Extreme carefulness and highly skilled techniques as well as time-consuming manipulative efforts are necessitated for such manual control of the focal plane of the projection lens. Attempts have therefore been made to develop a microfilm image processing apparatus featuring automatic focus control capabilities. One of such attempts has resulted in a microfilm image processing apparatus disclosed in Japanese Provisional Patent Publication (Kokai) 62-105574.

In an automatic mode of focus control operation performed in a known microfilm image processing apparatus, the projection lens is automatically moved on the basis of a signal indicating a detected difference in contrast or a detected phase difference of the image to be reproduced. Where an image recorded on a microfilm strip has no contrast, such a signal could not be produced and accordingly the automatic mode of focus control is inoperable. In order to clearly reproduce such an image on a viewing screen, the operator of the apparatus is required to manually control the focal plane of the lens.

When the automatic mode of focus control is inoperable in the prior-art microfilm image processing apparatus taught in the named Publication, the automatic focus control operation is interrupted with the projection lens (or more exactly the focusing lens element forming part of a projection lens unit) held in the position to which the lens has been moved through execution of the automatic focus control operation. The operator of the apparatus attempting to manually control the focal plane of the projection lens is for this reason not informed of the current location of the focal plane of the lens and could not determine the direction in which the projection lens is to be moved. The operator must control the focal plane of the lens simply by a rule of thumb that requires time-consuming and nerve-racking manipulative efforts.

The present invention contemplates elimination of such a problem and, accordingly, aims at provision of a microfilm image processing apparatus having automatic focus control capabilities enabling the operator of the apparatus to easily and accurately control the focal plane of the projection lens when the automatic mode of focus control is inoperable.

SUMMARY OF THE INVENTION

In accordance with one outstanding aspect of the present invention, there is provided in a microfilm image reader apparatus for detecting an image on a microfilm strip and projecting the detected image onto a target plane, comprising (a) means for illuminating the microfilm strip for producing an image-bearing beam of light bearing an image detected from the microfilm strip, (b) a projection lens for projecting the image-bearing beam of light onto the target plane, (c) first detecting means for detecting a condition in which the image-bearing beam of light is focussed with respect to the target plane, (d) first automatic focus control means responsive to the condition detected by the detecting means and operative to establish an automatic mode of focus control operation for automatically moving the projection lens to adjust the focal plane of the lens with respect to the target plane depending on the condition detected by the detecting means, (e) second detecting means for detecting a condition in which the automatic mode of focus control is inoperable, (f) second automatic focus control means responsive to the condition detected by the second detecting means and operative to automatically move the projection lens to a position having its focal plane located on a predetermined plane with respect to the target plane when it is detected by the second detecting means that the automatic mode of focus control is inoperable, and (g) manual focus control means for permitting manual adjustment of the focal plane of the projection lens after the projection lens is moved to the position by the second automatic focus control means. In a microfilm image reader apparatus thus constructed and arranged in accordance with the first outstanding aspect of the present invention, there may be further provided indicating means for indicating the direction in which the projection lens should be moved with respect to the target plane by the manual focus control means when the projection lens is moved to the position by the second automatic focus control means. In this instance, the manual focus control means may comprise manually operated signal input means for manually entering a signal requiring manual adjustment of the focal plane of the projection lens, wherein the indicating means is located in proximity to the manual focus control means.

In accordance with another outstanding aspect of the present invention, there is provided a microfilm image reader apparatus for detecting an image recorded on a microfilm strip, comprising (a) a projection lens having an optical axis therethrough and arranged to receive an image-bearing beam of light bearing an image detected from the microfilm strip and project the image-bearing beam of light therefrom, (b) first detecting means for detecting a condition in which the image-bearing beam of light is focussed, (c) first automatic focus control means responsive to the condition detected by the first detecting means and operative to establish an automatic mode of focus control operation for automatically moving the projection lens in a direction parallel with the optical axis of the projection lens to adjust the focal plane of the lens depending on the condition detected by the detecting means, (d) second detecting means for detecting a condition in which the automatic mode of focus control is inoperable, (e) second automatic focus control means responsive to the condition detected by the second detecting means and operative to automatically move the projection lens to a predetermined position having its focal plane located on a predetermined plane with respect to the microfilm strip when it is detected by the second detecting means that the automatic mode of focus control is inoperable, and f) manual focus control means for permitting manual adjustment of the focal plane of the projection lens after the projection lens is moved to the predetermined position by the second automatic focus control means.

In accordance with still another outstanding aspect of the present invention, there is provided in a microfilm image projecting apparatus for detecting an image recorded on a microfilm strip and projecting the detected image onto a target plane, comprising (a) a projection lens for receiving an image-bearing beam of light bearing an image detected from the microfilm strip and project the image-bearing beam of light therefrom, the projection lens having an optical axis therethrough, detachably assembled to the apparatus and movable in opposite directions parallel with the optical axis, (b) first detecting means for detecting the presence of the projection lens assembled to the apparatus, (c) lens positioning means which, when the presence of the projection lens assembled to the apparatus is detected by the first detecting means, is operative to move the projection lens to a predetermined position close to a location at which the projection lens is to have its focal plane, (d) second detecting means for detecting a condition in which the image-bearing beam of light is focussed with respect to the target plane, and (e) automatic focus control means responsive to the condition detected by the second detecting means and operative to automatically move the projection lens from the predetermined position in a direction parallel with the optical axis of the projection lens to adjust the focal plane of the lens depending on the condition detected by the second detecting means.

BRIEF DESCRIPTION OF THE DRAWINGS

The features and advantages of a microfilm image processing apparatus according to the present invention will be more clearly appreciated from the following description taken in conjunction with the accompanying drawings in which:

FIG. 7 is a schematic view showing the general sensor arrangement forming part of a photosensitive focus detector unit incorporated in the microfiche reader-printer apparatus embodying the present invention;

FIGS. 8A, 8B and 8C are diagrams showing different locations at which a beam of light is focussed by the focusing lens element incorporated in the apparatus shown in FIGS. 1 and 3 with respect to the plane on which the beam of light incident on the photosensitive focus detector unit is to be found;

FIG. 9 is a graphic representation of the image contrast determined at various locations with respect to such a plane when a beam of light is under-focussed, correctly focussed and over-focussed;

FIGS. 11A, 11B and 11C, are flowcharts showing an example of the main routine program which may be executed by the read/print control cpu included in the control circuit illustrated in FIGS. 10A and 10B;

FIGS. 15A, 15B, 15C and 15D are flowcharts showing the details of an automatic focus control subroutine program included in the main routine program illustrated in FIGS. 10A to 10C.

DESCRIPTION OF THE PREFERRED EMBODIMENT

Figure 1:
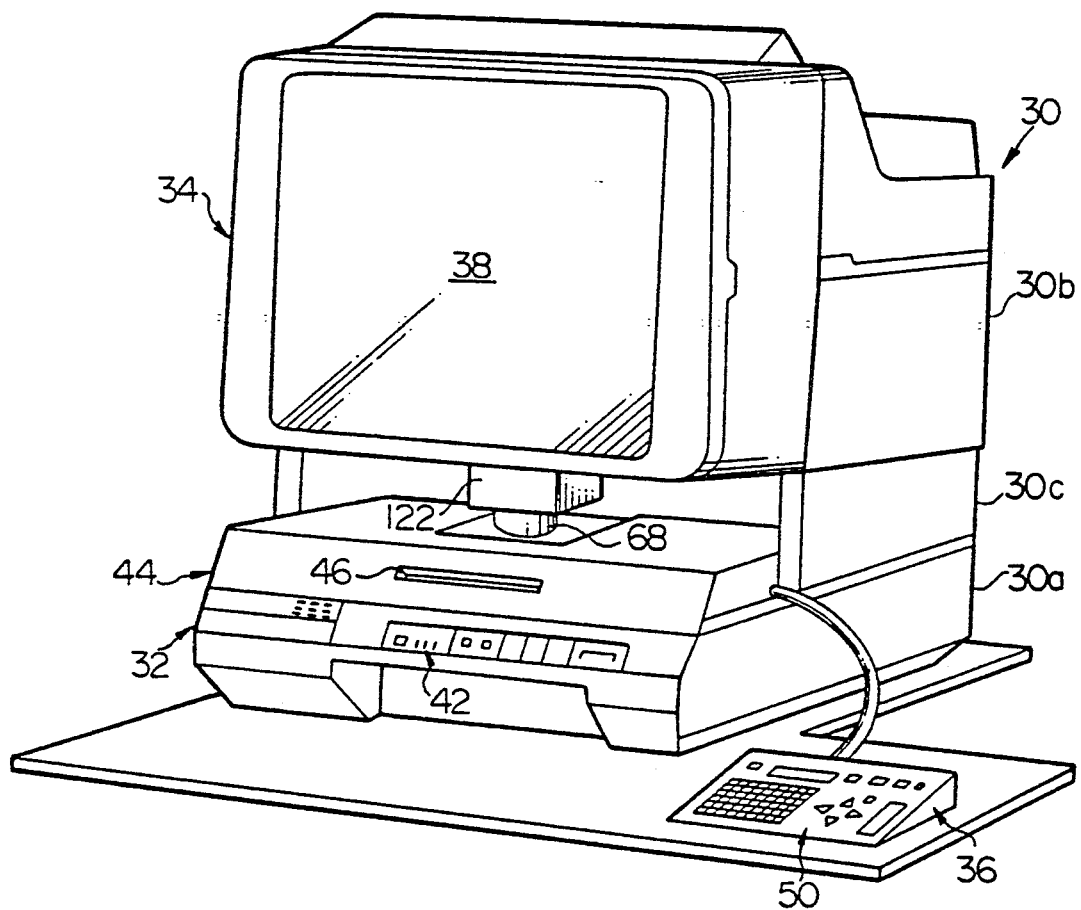
FIG. 1 is a perspective view showing the external construction of a microfilm image processing apparatus embodying the present invention.

FIG. 1 shows the external appearance of a microfilm image processing apparatus embodying the present invention and which is assumed to form part of a microfilm reader-printer system of the type using a microfiche. The microfilm reader-printer apparatus, which per se is well known in the art, has a housing structure 30 and is largely composed of a lower mechanical and optical module 32, an upper display module 34 positioned over the mechanical and optical module 32, and a control module implemented by a controller unit 36.

The housing structure 30 has a lower portion 30a forming part of the mechanical and optical module 32, an upper portion 30b forming part of the display module 34, and an intermediate portion 30c vertically intervening between the modules 32 and 34 as shown. The reader-printer apparatus further includes a printer module, the detailed construction of which is however not herein shown since the present invention is not directly concerned with the capabilities of such an additional module.

The upper display module 34 comprises a front viewing screen 38 and, as will be described in more detail, reflector mirrors incorporated within the upper portion 30b of the housing structure 30. An image-carrying beam of light carrying a frame of images picked up from an image frame of a microfiche is projected onto a target plane defined by this viewing screen and is displayed on the screen 38 by means of the mechanical and optical module 32 when the apparatus is in a reader mode of operation.

The lower mechanical and optical module 32 comprises a control panel 42 provided on a front wall of the lower portion 30a of the housing structure 30 and a microfiche handling unit 44 detachably assembled to the lower portion 30a of the housing structure 30. Though not shown in FIG. 1, the microfiche handling unit 44 has provided therein a microfiche carrier assembly adapted to feed a microfiche to a position to have one of its image frames optically picked up as will be described in more detail. A microfiche is manually loaded into the microfiche handling unit 44 through a microfiche feed slot 46 formed in a front wall portion of the handling unit 44. The microfiche carrier assembly incorporated in the microfiche handling unit 44 forms part of means to search for image frames on a microfiche thus loaded into the handling unit 44.

The microfiche handling unit 44 is detachably assembled to the housing structure 30 and can be detached from the housing structure 30 when desired. The handling unit 44 thus detached from the housing structure 30 may be exchanged with a microfilm handling unit of another type such as for example of the type using a continuous length of microfilm strip packed in roll form.

Figure 2:
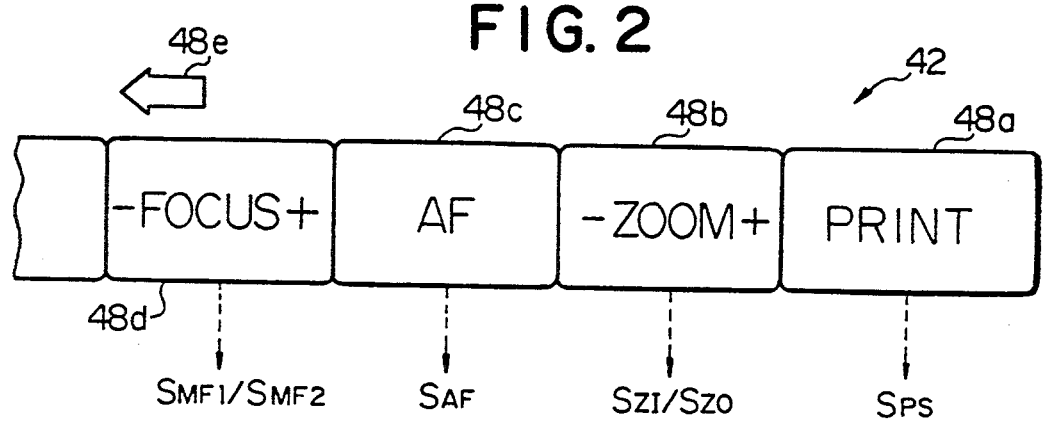
FIG. 2 is a schematic plan view showing, to an enlarged scale, part of the configuration of switches provided on the control panel of the microfilm image processing apparatus illustrated in FIG. 1.

As illustrated to an enlarged scale in FIG. 2, the control panel 42 has provided thereon various switches including a print start switch 48a ("PRINT"), a zoom-in/zoom-out control switch 48b ("ZOOM"), an automatic focus control mode select switch 48c ("AF"), and a manual focus control switch 48d ("FOCUS"). The print start switch 48a is used to start a cycle of printing operation and produces a signal $S_{PS}$ when manually depressed. The zoom-in/zoom-out control switch 48b is of the seesaw type and produces a zoom-in signal $S_{ZI}$ or a zoom-out signal $S_{ZO}$ effective to zoom in or out a frame of images on display when depressed at one end or the other, respectively, thereof. The automatic focus control mode select switch 48c is used to select an automatic mode of focus control operation and produces a signal $S_{AF}$ effective to select such a mode of operation when manually depressed. The manual focus control switch 48d is also of the seesaw type and when depressed at one end or the other thereof produces a first manual focus control signal $S_{MF1}$ effective to move the focal plane of a projection lens unit in one direction or a second manual focus control signal $S_{MF2}$ effective to move the focal plane of the projection lens unit in the other direction, respectively.

On the control panel 42 is further provided an indicator 48e which is to be activated to illuminate or flicker when the automatic mode of focus (AF) control is prohibited or inoperable. The indicator 48e is typically of the type using a light emitting diode (LED) and is located in proximity to the manual focus control switch 48d as shown.

The controller unit 36 is electrically connected to the mechanical and optical module 32 by means of a wire cable and has a number of keys and indicators provided thereon as commonly indicated at 50 in FIG. 1. The keys thus provided on the controller unit 36 include those for designating the numerical index allocated to a desired image frame on a microfiche and those for moving a microfiche through the position to have a desired one of the image frames optically picked up.

Figure 3:
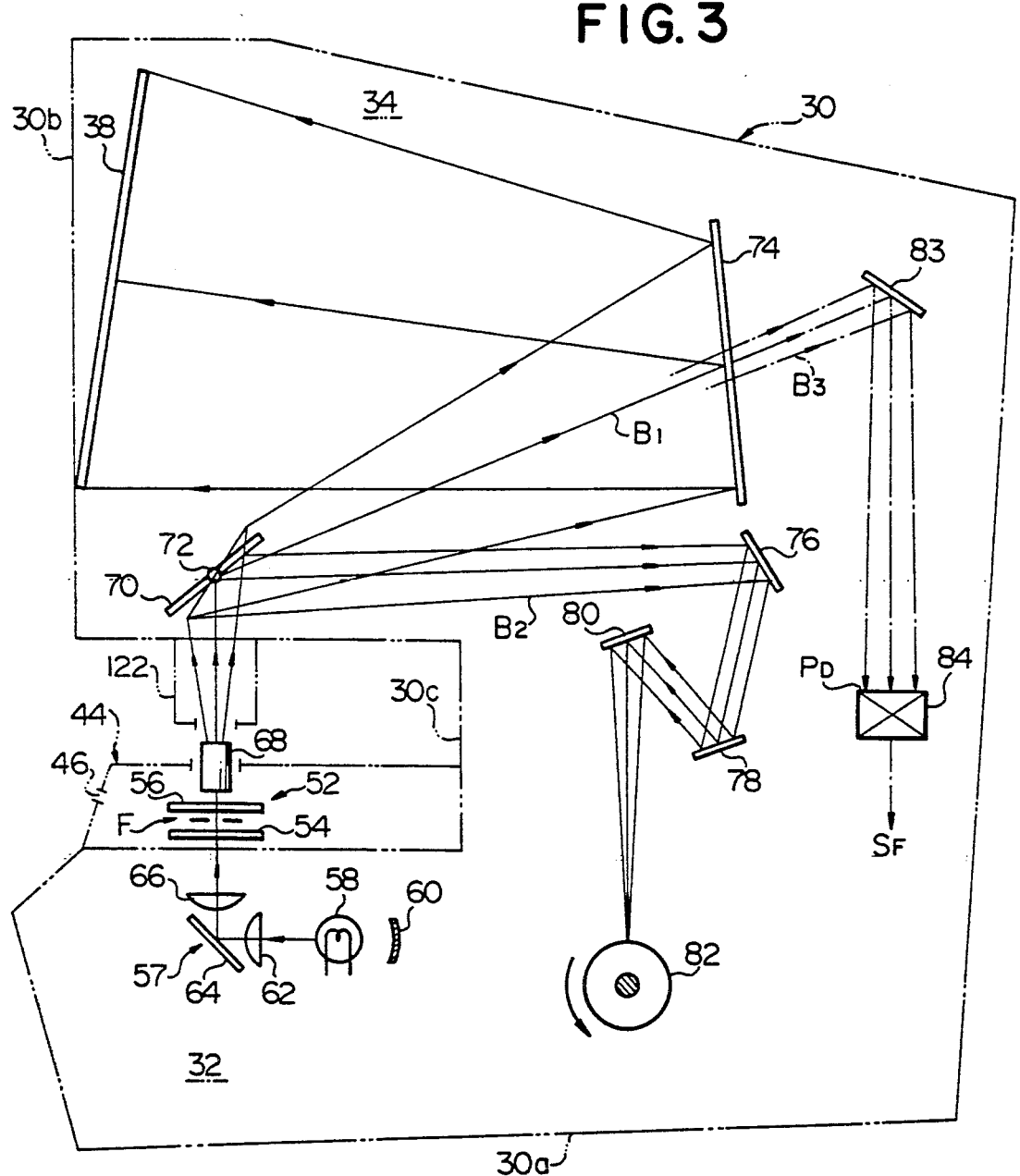
FIG. 3 is a schematic view showing the general mechanical and optical arrangements of the microfilm image processing apparatus shown in FIG. 1, the optical arrangement being schemally illustrated in side elevation.

FIG. 3 shows the internal arrangement of the modules 32 and 34 of the microfilm reader apparatus shown in FIG. 1. Within the lower portion 30a of the housing structure 30 is provided the microfiche carrier assembly which forms part of the microfiche handling unit 44.

The microfiche carrier assembly, now indicated at 52, is shown including a pair of transparent microfiche holder plates 54 and 56 which are vertically spaced apart in parallel from each other. A microfiche F manually fed into the module 32 through the microfiche feed slot 46 and carrying a single image frame or a plurality of image frames is held in place between these microfiche holder plates 54 and 56. The microfiche carrier assembly 52 is horizontally movable forwardly or rearwardly, or leftwardly or rightwardly so that any desired one of the image frames on a microfiche F carried thereon can be brought into a position to be optically picked up, viz., aligned with a beam of light passing through the assembly 52.

On one side of the microfiche carrier assembly 52 thus including the holder plates 54 and 56 is provided a light source assembly 57 which comprises an illumination lamp 58 and a concave reflector mirror 60 located in conjunction with the lamp 58. The illumination lamp 58 is energized with a voltage which is controlled to be optimum for each of the reader and printer modes of operation of the apparatus under consideration. The light emitted from the illumination lamp 58 is collimated by the concave reflector mirror 60 which has an optical axis perpendicular to the direction in which the beam of light is to be transmitted through the microfiche F. The collimated beam of light thus reflected from the reflector mirror 60 is passed through a first condenser lens 62 and is re-directed by a plane reflector mirror 64. Past the plane reflector mirror 64 is positioned a second condenser lens 66 through which the beam of light reflected from the mirror 64 is directed toward the microfiche F between the holder plates 54 and 56.

The beam of light transmitted through the microfiche F and now carrying image information picked up from any image frame recorded on the microfiche F is passed through a cylindrical projection lens unit 68 to a rockable reflector mirror 70 located within the display module 34. Though not shown in the drawings, the cylindrical projection lens unit 68 includes a focusing lens element and a zooming lens element, which are axially movable independently of each other with respect to the microfiche handling unit 44 as will be described in more detail. By virtue of the focusing lens element thus forming part of the projection lens unit 68, the location of the effective focal plane of the lens unit 68 is adjustable with respect to the microfiche F in place. The projection lens unit 68 as well as the reflector mirror 70 forms part of the optical system of the apparatus embodying the present invention.

Figure 4:
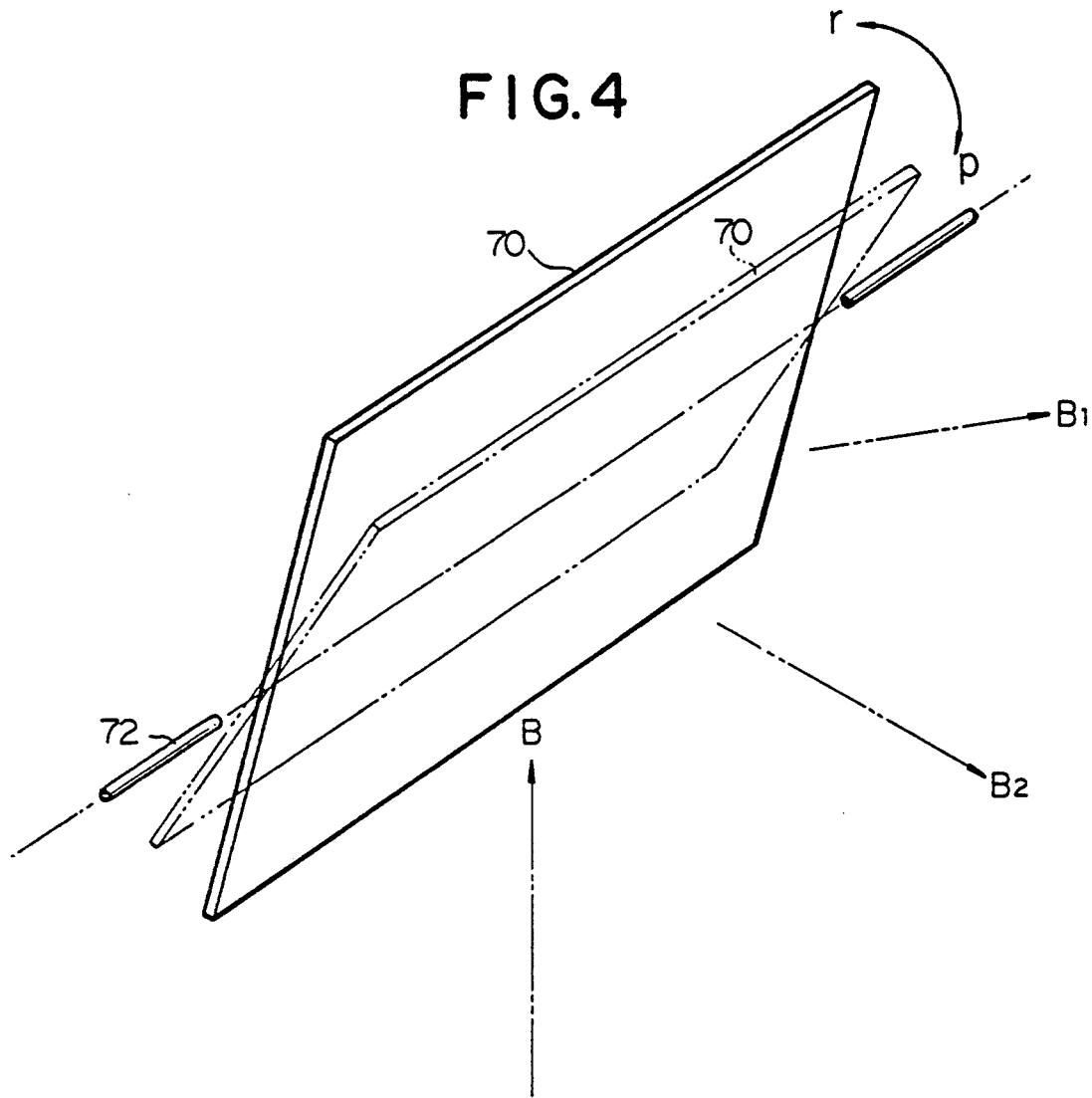
FIG. 4 is a perspective view showing the arrangement in which a rockable reflector mirror forming part of the optical system of the apparatus embodying the present invention is rockable between different angular positions.

FIG. 4 shows the arrangement in which the rockable reflector mirror 70 is rockable between different angular positions. As shown, the rockable reflector mirror 70 is supported on a pivot shaft 72 having a center axis coincident with the axis of turn of the mirror 70 and is rockable about the axis of the shaft 72 in either direction as indicated by arrowheads p and r. The pivot shaft 72 thus carrying the rockable reflector mirror 70 extends in parallel with the viewing screen 38. Though not shown in the drawings, the pivot shaft 72 has opposite end portions journalled in any structural member or members of the housing structure 30 and is operatively connected to and driven for pivotal movement by suitable mirror drive means.

Turning back to FIG. 3, the information-carrying beam of light may be re-directed from the reflector mirror 70 to an image projecting reflector mirror 74 and projected onto the viewing screen 38 positioned at the front end of the upper portion 30b of the housing structure 30. The projection lens unit 68 has its focal plane regulated to be located on the microfiche F in place. On the viewing screen 38 is thus reproduced a magnified version of any of the image frames recorded on the microfiche F.

The rockable reflector mirror 70 is pivotally movable about the center axis of the pivot shaft 72 in the direction of arrow r to a first angular position directing the beam of light B to travel along a first path of light $B_1$ as indicated by full lines and in the direction of arrow p to a second angular position directing the beam B to travel along a second path of light $B_2$ as indicated by dot-and-dash lines. As will be described in more detail, the rockable reflector mirror 70 is to be driven to turn in the direction of arrow r to the first angular position thereof when a reader mode of operation is selected in the apparatus and in the direction of arrow p to the second angular position thereof when a printer mode of operation is selected in the apparatus.

During the reader mode of operation, the rockable reflector mirror 70 is thus held in the first angular position thereof so that the beam of light B emanating from the projection lens unit 68 is directed to travel along the first path of light $B_1$ to the image projecting reflector mirror 74. The beam of light incident on the image projecting reflector mirror 74 is partially re-directed therefrom and is projected onto the viewing screen 38 to reproduce on the viewing screen 38 a magnified version of an image frame picked up from the microfiche F currently in use and borne by the light incident on the screen 38.

On the other hand, during the printer mode of operation, the rockable reflector mirror 70 is held in the second angular position thereof so that the beam of light B issuing from the projection lens unit 68 is directed to advance along the second path of light $B_2$ and travels past first, second and third re-directing mirrors 76, 78 and 80 toward an image reproducing photosensitive drum 82 which forms part of the printer module of the reader-printer apparatus embodying the present invention. Though not shown, the printer module further includes various actuators associated with the drum 82. As is well known in the art, such actuators are adapted to produce latent images on the peripheral surface of the drum 82 in response to an image-carrying beam of light incident on the drum 82 and converting the latent images into visible images of, for example, a toner onto a suitable form of record medium such as typically a sheet of paper.

The image projecting reflector mirror 74 is provided in the form of a semitransparent mirror (half mirror or one-way vision mirror) in the apparatus embodying the present invention. Thus, the beam of light incident on the mirror along the first path of light $B_1$ is partially re-directed toward the viewing screen 38 and is partially transmitted through the mirror 74 to travel along a third path of light $B_3$ as indicated by full lines in FIG. 3. In this third path of light $B_3$ is provided a redirecting mirror 83 which is located in conjunction with a photosensitive focus detector unit 84 having a light sensitive plane $P_D$ directed toward the rockable reflector mirror 70. The beam of light which has reached the image projecting reflector mirror 74 is thus partially allowed to pass through the image projecting reflector mirror 74 and is re-directed from the re-directing mirror 83 to the photosensitive focus detector unit 84. The detector unit 84 is located such that the distance which a beam of light travels from the projection lens unit 68 to the light sensitive plane $P_D$ of the detector unit 84 along the third path of light $B_3$ equals the distance which a beam of light travels from the projection lens unit 68 to the inner face of the viewing screen 38 along the first path of light $B_1$. A preferred example of the detailed construction of the photosensitive focus detector unit 84 will be hereinafter described.

Figure 5:
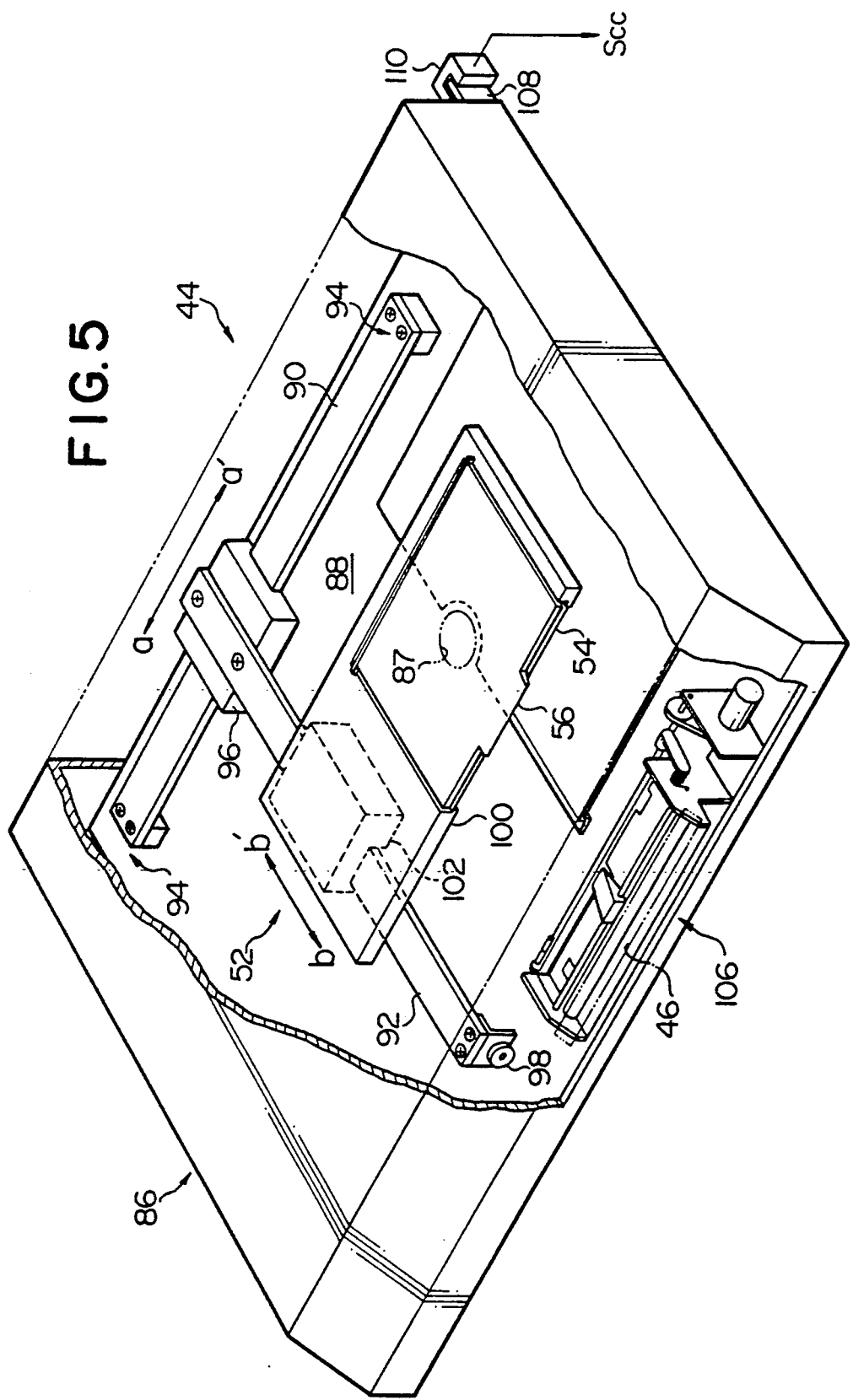
FIG. 5 is a partially cut-away perspective view showing the internal arrangement of the microfiche handling unit which forms part of the microfilm image processing apparatus embodying the present invention.

FIG. 5 shows the internal arrangement of the microfiche handling unit 44 incorporating the microfiche carrier assembly 52 in the apparatus hereinbefore described with reference to FIGS. 1 to 3. The microfiche handling unit 44 is detachably assembled to the housing structure 30 and has a hollow casing 86 which is adapted to fit into the lower portion 30a of the housing structure 30. On a front wall portion of the casing 86 is formed the microfiche feed slot 46 through which a microfiche is to be manually loaded into the microfiche handling unit 44. The casing 86 has a horizontal member formed with an opening 87 which is vertically aligned with the path of light from the light source assembly 57 accommodated in the lower portion 30a of the housing structure 30.

The microfiche carrier assembly 52 incorporated in such a microfiche handling unit 44 comprises an X-Y carriage structure 88 which is largely composed of a lateral or x-axis linear motor 90 and a fore-and-aft or y-axis linear motor 92. The x-axis linear motor 90 horizontally extends in a lateral direction of the apparatus and is fixedly secured to the casing 86 by suitable fastening means as indicated at 94. The y-axis linear motor 92 extends in a fore-and-aft direction of the apparatus and has fixedly carried at one end thereof a slide member 96 slidably engaging the x-axis linear motor 90.

The slide member 96 is slidable on and along the x-axis linear motor 90 so that the y-axis linear motor 92 as a whole is movable in opposite directions parallel with the x-axis linear motor 90 as indicated by arrowheads a and a'. The y-axis linear motor 92 connected at one end to the slide member 96 is movably supported at the other by a suitable support or guide member (not shown) and may thus have a roller 98 received on the support or guide member.

The y-axis linear motor 92 has mounted thereon a holder carriage plate 100 by means of a bracket member 102 engaging the linear motor 92. The bracket member 102 is slidable on and along the y-axis linear motor 92 so that the holder carriage plate 100 is movable in opposite directions parallel with the y-axis linear motor 92 as indicated by arrowheads b and b'.

The holder carriage plate 100 is thus horizontally movable along the x-axis linear motor 90 in a direction of arrowhead a or a' and along the y-axis linear motor 92 in a direction of arrowhead b or b'. Accordingly, the holder carriage plate 100 may assume any coordinate position with respect to the casing 86 or, particularly to the opening 87 provided in the casing 86 in alignment with the path of light from the light source assembly 57 positioned below the microfiche handling unit 44. The carriage plate 100 is formed with an opening through which the microfiche holder plates 54 and 56 are fitted to the plate 100. As the carriage plate 100 is driven to move along the x-axis by means of the linear motor 90 and/or along the y-axis by means of the linear motor 92, any of the image frames recorded on the microfiche F received between the holder plates 54 and 56 is brought into alignment with the path of light from the light source assembly 57.

Within the casing 86 of the microfiche handling unit 44 is further provided a microfiche loading/unloading assembly 106 which is positioned internally of the microfiche feed slot 46 in the front wall portion of the casing 86. When a microfiche F is manually inserted into the casing 86 through the microfiche feed slot 46, the microfiche loading/unloading assembly 106 passes the microfiche F from the slot 46 to the holder plates 54 and 56 so that the microfiche F is received between the holder plates 54 and 56. The microfiche loading/unloading assembly 106 is further operative to pass the microfiche F from the holder plates 54 and 56 back to the microfiche feed slot 46 so that the microfiche F is withdrawn from the microfiche handling unit 44 through the slot 46. The construction of such a microfiche loading/unloading assembly 106 is rather immaterial to the understanding of the present invention and for this reason will not be herein described.

In association with the microfiche handling unit 44 constructed and arranged as hereinbefore described is provided detecting means to detect if the handling unit 44 is correctly assembled to the housing structure 30 of the apparatus. Such detecting means is herein shown comprising a lug member 108 projecting rearwardly from a rear wall portion of the casing 86 and a photocoupling device 110 secured to the intermediate portion 30c of the housing structure 30. The photocoupling device 110 is typically composed of the combination of a light emitter element and a photoelectric transducer element spaced apart from the light emitter. The lug member 108 projecting from the casing 86 intervenes between the light emitting and phototransducer elements of the photocoupling device 110 when the microfiche handling unit 44 is correctly assembled to the housing structure 30. The lug member 108 being thus located between the light emitting and phototransducer elements, the beam of light emitted from the former is intercepted by the lug member 108 and enables the latter to output a carrier complete state signal $S_{CC}$ of logic "0" or "1" state indicating that the microfiche handling unit 44 is correctly assembled to the housing structure 30 and accordingly the apparatus is ready to start operation.

The projection lens unit 68 is provided in the form of the combination of a focusing lens element and a zooming lens element having a magnification/reduction ratio (hereinafter referred to simply as magnification ratio) variable within a predetermined range.

Figure 6:
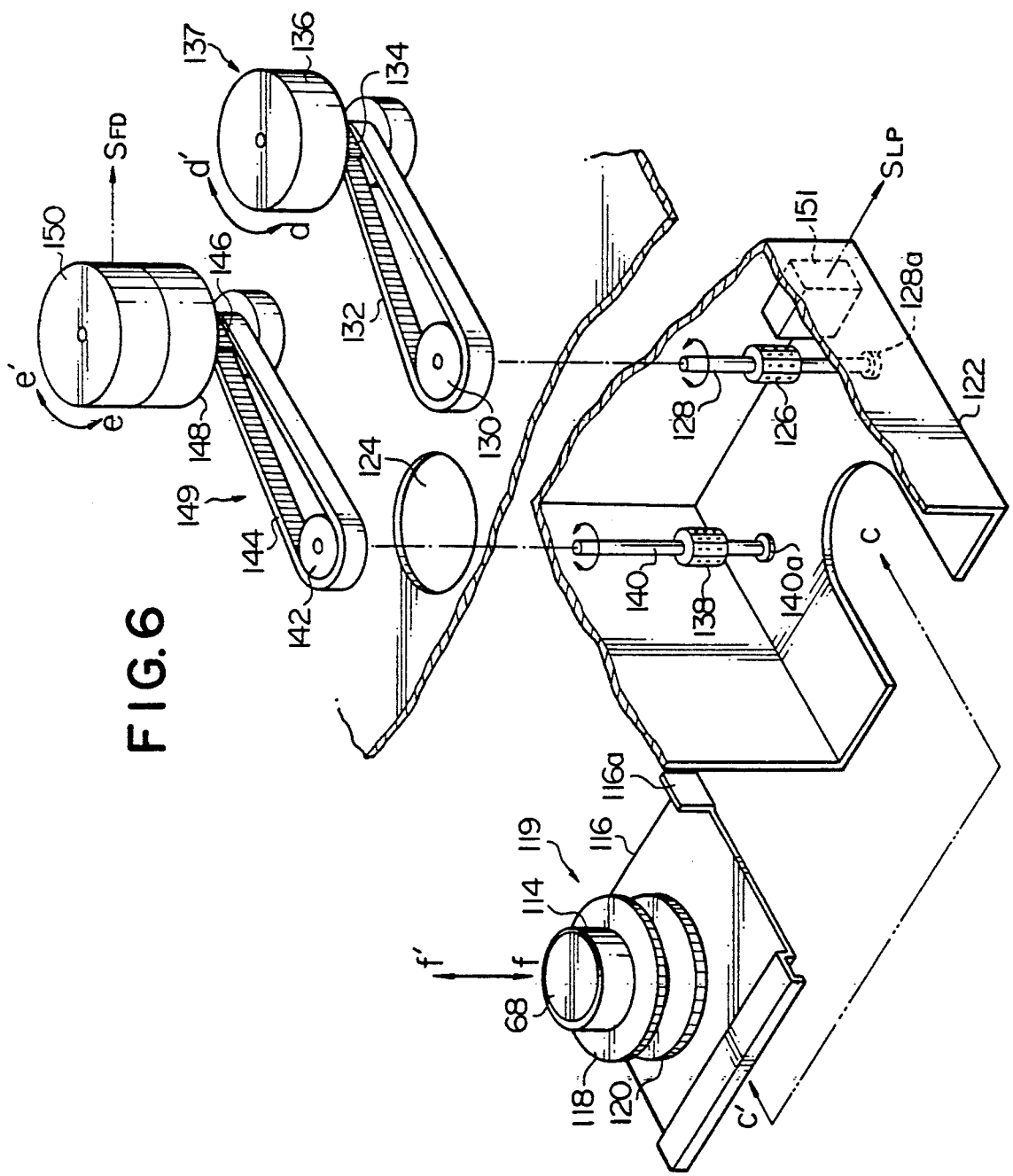
FIG. 6 is a fragmentary perspective view showing the general mechanical driving arrangement for a projection lens provided in the apparatus embodying the present invention.

As illustrated in FIG. 6, such a projection lens unit 68 is received in a cylindrical sleeve 114 rotatably mounted on a lens support plate 116. The sleeve 114 is engaged by or secured to externally toothed annular spur gears 118 and 120 coaxially encircling the sleeve 114 and axially spaced apart in parallel from the zoom control gear 118.

One of the gears 118 and 120 such as the gear 118 as shown is used as a zoom control gear and is associated with the zooming lens element of the lens unit 68. The other of the gears such as the gear 120 is used as a focus control gear and is associated with the focusing lens element of the lens unit 68. As the zoom control gear 118 is driven to turn in either direction about the center axis of the lens unit 68, the zooming lens element of the projection lens unit 68 associated with the gear 118 has its effective magnification ratio increased or decreased within the range predetermined for the lens unit 68. Likewise, the focusing lens element of the projection lens unit 68 has its effective focal plane moved away from or toward the lens unit 68 within a range predetermined for the lens element as the focus control gear 120 is driven to turn in either direction about the center axis of the lens unit 68.

The lens assembly 119 is detachably fitted into a lens casing 122 which is secured to or forms part of the lower portion 30a of the housing structure 30 as will be seen in FIG. 1. The lens assembly 119 can be moved into or out of the lens casing 122 as indicated by arrowheads c and c' in FIG. 6. In this instance, the lens assembly 119 may be moved into or out of the lens casing 122 either manually or automatically but is herein assumed to be automatically moved under the control of a signal generated in the control system of the apparatus, as will be described in more detail.

When the projection lens assembly 119 is assembled into the casing 122, the projection lens unit 68 is aligned downwardly with the opening 87 provided in the casing 86 of the microfiche handling unit 44 (FIG. 5) and upwardly with an opening 124 provided in a bottom panel member forming part of the upper portion 30b of the housing structure 30 as shown in FIG. 6. The lens assembly 119 thus fitted into the housing structure 30 may be disassembled from the apparatus for exchange with another projection lens assembly using a projection lens having other ranges of magnification ratio and focal plane.

The zoom control gear 118 is held in mesh with a first pinion 126 further provided within the lens casing 122 and rotatable about an axis parallel with the center axis of the projection lens unit 68. The first pinion 126 is carried on a drive shaft 128 extending upwardly into the upper portion 30b of the housing structure 30 through an opening (not shown) provided in the bottom panel member forming part of the upper housing portion 30b. The drive shaft 128 is journalled at its lower end to the lens casing 122 by means of a journal element 128a as shown. Within the upper housing portion 30b, the drive shaft 128 thus carrying the pinion 126 within the casing 122 is coupled to a driven pulley 130 which cooperates through an endless drive belt 132 with a driving pulley 134 to be driven by a zoom control gear drive motor 136 typically implemented by a reversible stepper motor. The zoom control gear 118, pinion 126, drive shaft 128, driven pulley 130, drive belt 132, driving pulley 134 and motor 136 provide in combination a first lens drive assembly 137 for the projection lens unit 68.

The zoom control gear drive motor 136 forming part of the first lens drive assembly 137 is initiated into motion in response to a zoom-in signal $S_{ZI}$ or a zoom-out $S_{ZO}$ produced by the zoom-in/zoom-out control switch 48b (FIG. 2) on the control panel 42 of the apparatus. As has been noted, the zoom-in signal $S_{ZI}$ or the zoom-out $S_{ZO}$ is produced with the zoom-in/zoom-out control switch 48b depressed at one end or the other, respectively, thereof.

Likewise, the focus control gear 120 associated with the focusing lens element of the projection lens unit 68 is held in mesh with a second pinion 138 also provided within the lens casing 122 and rotatable about an axis parallel with the center axis of the projection lens unit 68. The second pinion 138 is carried on a drive shaft 140 extending upwardly into the upper portion 30b of the housing structure 30 through an opening (not shown) provided in the bottom panel member forming part of the housing portion 30b. The drive shaft 140 is journalled at its lower end to the lens casing 122 by means of a journal element 140a as shown. The drive shaft 140 thus carrying the second pinion 138 in the casing 122 is, within the upper housing portion 30b, also coupled to a driven pulley 142 which cooperates through an endless drive belt 144 with a driving pulley 146 to be driven by a focus control gear drive motor 148 typically implemented by a reversible stepper motor. The focus control gear 120, pinion 138, drive shaft 140, driven pulley 142, drive belt 144, driving pulley 146 and motor 148 provide in combination a second lens drive assembly 149 for the projection lens unit 68. The drive shaft 140 is journalled at its lower end to the lens casing 122 by means of a journal element 140a as shown.

The focus control gear drive motor 148 thus forming part of the second lens drive assembly 149 may be initiated into motion in response to a signal generated on the basis of a signal $S_{AF}$ produced by the automatic focus control mode select switch 48c. The motor 148 may be otherwise initiated into motion in response to the first manual focus control signal $S_{MF1}$ or the second manual focus control signal $S_{MF2}$ produced with the manual focus control switch 48d depressed on the control panel 42. As has been noted, the first manual focus control signal $S_{MF1}$ or the second manual focus control signal $S_{MF2}$ is produced with the manual focus control switch 48d depressed at one end or the other, respectively, thereof.

Each of the reversible stepper motors 136 and 148 of the first and second lens drive assemblies 137 and 149 has an output shaft connected to the driving pulley 134 or 146 directly or by means of a suitable reduction gear assembly, though not shown in the drawings. The output shaft of the motor 148 for the focus control gear 120 in particular is coupled to the input shaft of a rotary-shaft encoder 150. The rotary-shaft encoder 150 is responsive to the rotation of the output shaft of the motor 148 and produces a pulse signal $S_{FD}$ variable with the angle and speed of rotation of the focus control gear 120 from a predetermined reference angular position of the lens unit 68. The signal $S_{FD}$ output from the rotary shaft encoder 150 is thus indicative of the current axial position of the focusing lens element of the projection lens unit 68 moved from a predetermined reference axial position and accordingly of the focal plane currently achievable by the lens unit 68. Such a rotary shaft encoder 150 is well known in the art and may be of any desired type such as for example the optical, magnetic or mechanical brush type.

Further provided within or otherwise associated with the lens casing 122 is a lens assembly detector 151. The lens assembly detector 151 may comprise a lug member 116a projecting from the lens support plate 116 and a photocoupling device secured to and appropriately located in the lens casing 122 as shown. The photocoupling device may be composed of the combination of light emitter and photoelectric transducer elements similarly to the previously described photocoupling device 110. Thus, when the projection lens assembly 119 is correctly fitted into the lens casing 122 as indicated by arrowhead c in FIG. 6, the lens assembly detector 151 outputs a signal $S_{LP}$ of logic "0" or "1" state indicating that the lens assembly 119 including the projection lens unit 68 is correctly positioned in the lens casing 122.

Activated by the zoom-in signal $S_{ZI}$ or zoom-out $S_{ZO}$ produced by the zoom-in/zoom-out control switch 48b, the zoom control gear drive motor 136 drives the drive pulley 134 for rotation in the direction indicated by arrowhead d or d'. A driving force is thus transmitted from the motor 136 to the sleeve 114 of the projection lens assembly 119 by way of the drive pulley 134, endless belt 132, driven pulley 130, shaft 128, pinion 126 and zoom control gear 118 so that the sleeve 114 is driven to turn with respect to the lens support plate 116 about the center axis of the cylindrical projection lens unit 68.

On the other hand, the focus control gear drive motor 148 is initiated into motion in response to a signal generated on the basis of the signal $S_{AF}$ produced by the automatic focus control mode select switch 48c or to the first or second manual focus control signal $S_{MF1}$ or $S_{MF2}$ produced by the manual focus control switch 48d.

The motor 148 then drives the drive pulley 146 for rotation in the direction indicated by arrowhead e or e'. A driving force is accordingly transmitted from the motor 148 to the sleeve 114 of the projection lens assembly 68 by way of the drive pulley 146, endless belt 144, driven pulley 142, shaft 140, pinion 138 and focus control gear 120 so that the sleeve 114 is also driven to turn with respect to the lens support plate 116.

The turning movement of the sleeve 114 about the center axis of the projection lens unit 68 is translated into axial movement of either the zooming lens element or the focusing lens element forming part of the lens unit 68. The zooming or focusing lens element of the projection lens unit 68 is accordingly caused to move axially with respect to the lens support plate 116 downwardly away from or upwardly toward the rockable reflector mirror 70 as indicated by arrowhead f or f', respectively. As the zooming lens element or the focusing lens element forming part of the projection lens 68 is caused to axially move downwardly or upwardly by means of the zoom or focus control gear 118 or 120, there results a change in the effective magnification ratio or the effective focal plane of the lens unit 68 within the respective predetermined range of the parameter.

The distance of axial movement of the focusing lens element of the projection lens unit 68 is proportional to the angle of rotation of the output shaft of the motor 148 for the focus control gear 120 and accordingly the input shaft of the rotary-shaft encoder 150. The distance of movement of the focusing lens element being representative of the focal plane currently achievable by the lens unit 68, the pulse signal $S_{FD}$ output from the rotary-shaft encoder 150 is, in effect, indicative of the focal plane currently achievable by the lens unit 68.

The focus control gear drive motor 148 may be actuated by the signal $S_{MF1}$ or $S_{MF2}$ produced by the manual focus control switch 48d or may be operated under the control of a signal generated on the basis of the signal $S_{AF}$ produced by the automatic focus control mode select switch 48c. In the presence of the signal $S_{AF}$ produced by the switch 48c, the control signal for the motor 148 is generated through detection of the currently effective focal plane by means of the rotary-shaft encoder 150. When the automatic focus control mode select switch 48c is depressed by the operator of the apparatus, the focal plane to be achieved by the projection lens unit 68 is thus controlled on the basis of the pulse signal $S_{FD}$ output from the rotary-shaft encoder 150. The beam of light emanating from the projection lens unit 68 is incident on each of the viewing screen 38 and the photosensitive focus detector unit 84 if the beam is directed to travel along the first path of light $B_1$ or onto the photosensitive drum 82 if the beam is directed to travel along the second path of light $B_2$, depending on the angular position of the rockable reflector mirror 70.

The photosensitive focus detector unit 84 may be implemented by a linear or two-dimensional array of appropriate photoelectric sensor or transducer elements such as, for example, photoelectric cells, photoconductive transducers, photodiodes, phototransistors or charge-coupled devices (CCD). These sensor or photoelectric transducer elements may be preferably arranged to provide a through-the-lens (TTL) system. When implemented by the through-the-lens (TTL) system, the photosensitive focus detector unit 84 used in the apparatus embodying the present invention may be constructed to allow detection of the contrasts of images to result from a beam of light incident at different locations of a path of light or detection of the phase differences of a beam incident at different locations of a path of light. FIG. 7 shows an example of the sensor arrangement forming the photosensitive focus detector unit 84 which operates through detection of the differences in the contrasts.

Referring to FIG. 7, the photosensitive focus detector unit 84 comprises first and second semitransparent mirrors 152 and 154 and first, second and third two-dimensional arrays 156, 158 and 160 of charge-coupled devices. The first semitransparent mirror 152 is of the type having the transmission-to-reflection ratio of 2:1 and is disposed at 45 degrees to the third path of light $B_3$ of the information-carrying beam passed through the image projecting reflector mirror 74 (FIG. 3). The second semitransparent mirror 154 is of the type having the transmission-to-reflection ratio of 1:1 and is also disposed at 45 degrees to the third path of light $B_3$ from the reflector mirror 74.

The first array 156 of charge-coupled devices is responsive to the light reflected from the first semitransparent mirror 152. The first array 156 of charge-coupled devices has a light sensitive plane located a predetermined distance $d_1$ anterior to a fixed predetermined plane at which the beam of light admitted into the detector unit 84 is to be correctly focused by the projection lens unit 68. Such a fixed predetermined plane is in effect coincident with the light sensitive plane $P_D$ of the detector unit 84 and, thus, the distance $d_1$ is provided by the difference between the upper path of light $P_2$-$P_3$-$P_4$ and the path of light $P_2$-$P_1$ in FIG. 7.

The second array 158 of charge-coupled devices is responsive to the light transmitted through the first semitransparent mirror 152 and reflected from the second semitransparent mirror 154 and has a light sensitive plane providing the light sensitive plane $P_D$ of the photosensitive focus detector unit 84 on which the beam of light incident on the photosensitive focus detector unit 84 is to be correctly focused by the projection lens unit 68.

The third array 160 of charge-coupled devices is responsive to the light transmitted through the second semitransparent mirror 154 and has a light sensitive plane located a predetermined distance $d_2$ behind the plane $P_D$. The distance $d_2$ is in effect provided by the paths of light indicated by lines $P_3$-$P_5$ and line $P_4$-$P_3$-$P_5$ in FIG. 7.

The individual charge-coupled devices forming each of the first, second and third CCD arrays 156, 158 and 160 are arranged in rows and columns and are thus operative to produce signals $S_F$ indicative of the intensities of light at the crossings of such rows and columns when irradiated with the beam of light from any of the semitransparent mirrors 60 and 62. Thus, the signals $S_F$ include a signal indicative of the maximum intensity $L_{max}$ and a signal indicative of the minimum intensity $L_{min}$ of the light incident on the CCD array. The charge-coupled devices forming each of the CCD arrays 156, 158 and 160 are electrically connected to the control circuit 162 which receive the signals $S_F$. From the signals $S_F$ supplied from each of the arrays 156, 158 and 160 of charge-coupled devices, the control circuit 162 determines the maximum and minimum intensities $L_{max}$ and $L_{min}$ of the light incident on each CCD array and calculates from these values the image contrast $C_s$ for each CCD array. This image contrast $C_s$ is given as the differential light intensity between the maximum and minimum intensities $L_{max}$ and $L_{min}$ of light, hence $$C_s = L_{max} - L_{min} \qquad \text{Eq. 1}$$

Image contrasts $C_{sa}$, $C_{sb}$ and $C_{sc}$ are thus determined in respect of the first, second and third CCD arrays 156, 158 and 160, respectively, of the photosensitive focus detector unit 84. These image contrasts $C_{sa}$, $C_{sb}$ and $C_{sc}$ differ from one another and any one of these must be larger than the others. This largest image contrast $C_{sa}$, $C_{sb}$ or $C_{sc}$ must have resulted from the CCD array 156, 158 or 160 on which the incident beam of light is focussed.

If the image contrast $C_{sa}$ determined in respect of the first array 156 of charge-coupled devices is the largest, this means that the incident beam of light is focussed on or in the vicinity of the first CCD array 156 as shown in FIG. 8A. Such a beam of light is "under-focussed" with respect to the plane $P_D$.

If the image contrast $C_{sb}$ determined in respect of the second array 158 of the charge-coupled devices is the largest, then the incident beam of light must be focussed on or in the vicinity of the second CCD array 158 as shown in FIG. 8B. Such a beam of light is correctly focussed with respect to the plane $P_D$.

On the other hand, if the image contrast $C_{sc}$ determined in respect of the third array 160 of charge-coupled devices is the largest, the incident beam of light must be focussed on or in the vicinity of the third CCD array 160 as shown in FIG. 8C. Such a beam of light is "over-focussed" with respect to the plane $P_D$.

FIG. 9 shows the image contrast $C_s$ determined at various locations with respect to the plane $P_D$ when the beam of light is under-focsssed (curve Ca), correctly focussed (curve Cb) and over-focussed (curve Cc).

When the beam of light is correctly focussed as shown in FIG. 8B, the image contrast $C_{sb}$ determined in respect of the second CCD array 158 is larger than the image contrasts $C_{sa}$ and $C_{sc}$ determined in respect of the first and third CCD arrays 156 and 160 and the image contrasts $C_{sa}$ and $C_{sc}$ are equal to each other ($=C_{so}$) as will be seen from curve Cb. When the beam of light is under-focussed as shown in FIG. 8A, the image contrast $C_{sa}$ is larger than the image contrast $C_{sc}$ as will be seen from curve Ca. When the beam of light is over-focussed as shown in FIG. 8C, the image contrast $C_{sc}$ is larger than the image contrast $C_{sa}$ as will be seen from curve Cc. From the relationship between the image contrasts $C_{sa}$, $C_{sb}$ and $C_{sc}$ determined in respect of the first, second and third CCD arrays 156, 158 and 160, respectively, of the photosensitive focus detector unit 84, the control circuit 162 detects whether the beam of light incident on the detector unit 84 is correctly focussed, under-focussed or over-focussed with respect to the light sensitive plane $P_D$.

Figure 10A:
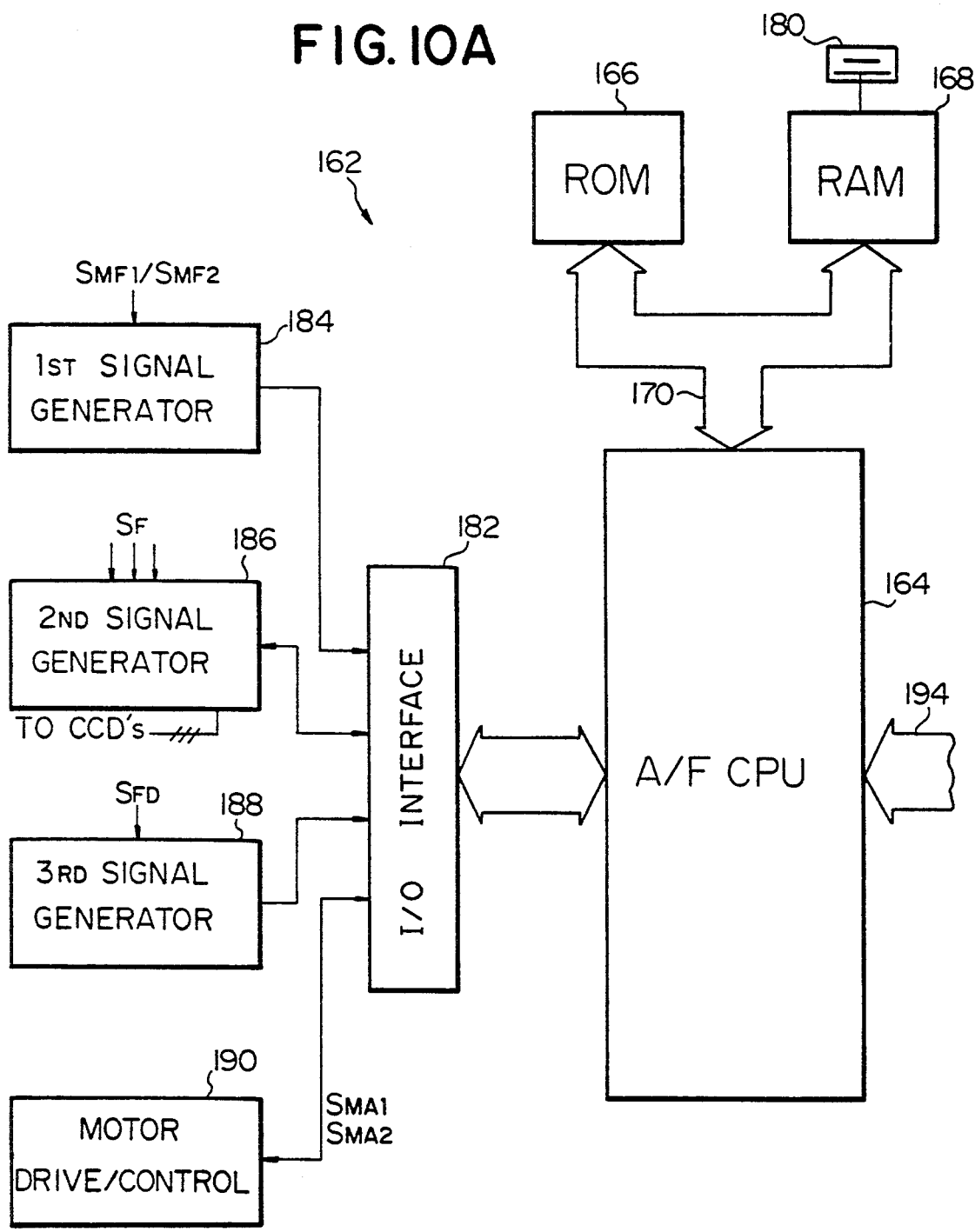
FIGS. 10A and 10B are block diagrams schematically showing the general configuration of a preferred example of a control circuit incorporated in the apparatus embodying the present invention.
Figure 10B:
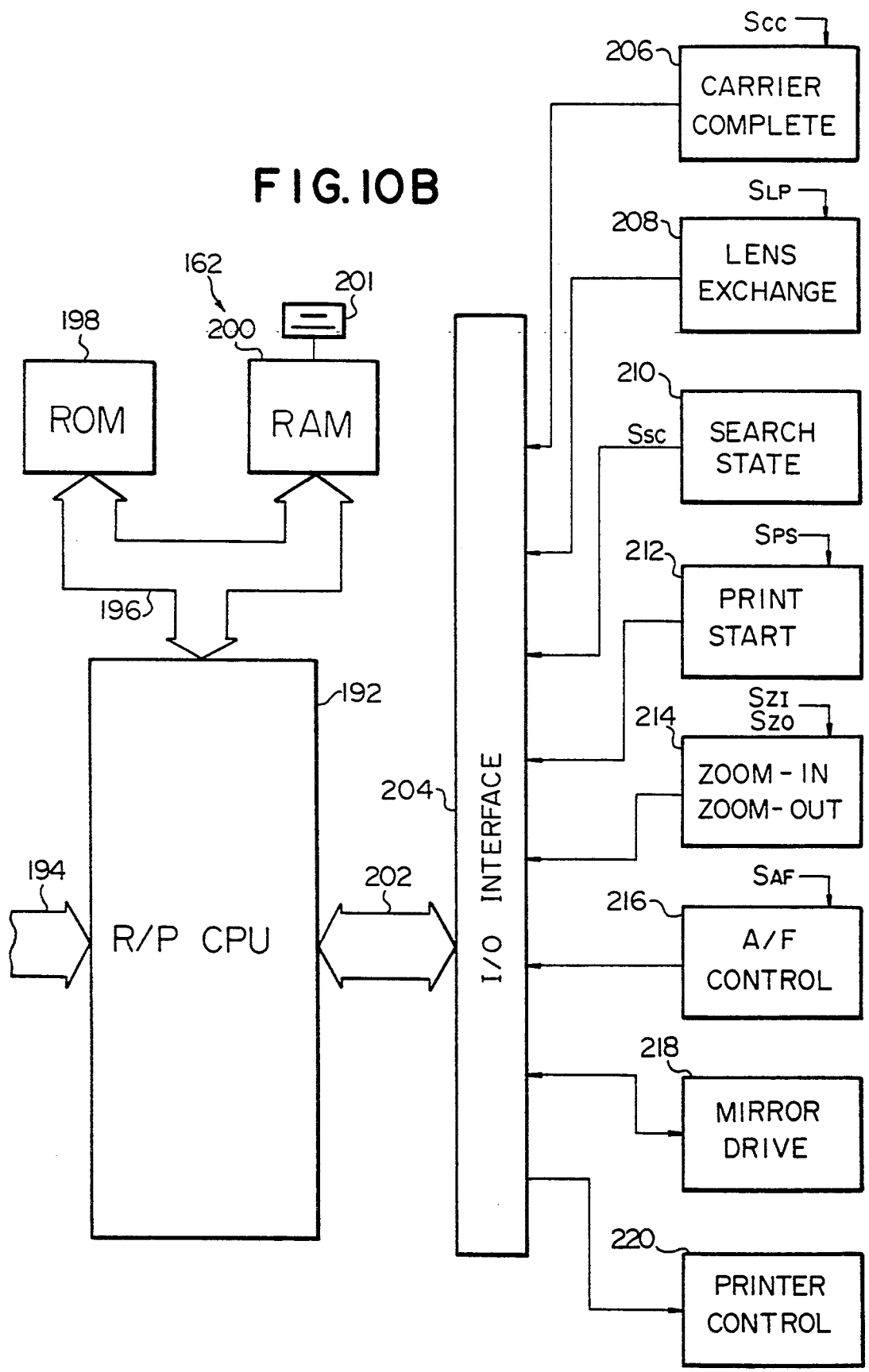

FIGS. 10A and 10B show the general configuration of a preferred example of the control circuit 162 used in the apparatus embodying the present invention. The control circuit 162 largely consists of a lens position control section illustrated in FIG. 10A and a read/print control section illustrated in FIG. 10B.

The lens position control section illustrated in FIG. 10A comprises a lens position control or automatic focus control central processing unit 164 (A/F CPU) connected to a read-only memory 166 (ROM) and a random-access memory 168 (RAM) through a bidirectional address/data bus 170. The random-access memory 168 is provided with a backup power supply source 180 to retain the content of the memory 168 when the control circuit 162 is disconnected from a main power supply.

The automatic focus control central processing unit 164 is connected through an input/output interface buffer 182 to first, second and third signal generator circuits 184, 186 and 188 and a motor drive/control circuit 190.

The first signal generator 184 is connected to the manual focus control switch 48d on the control panel 42 (FIG. 2) and is thus responsive to the first or second manual focus control signal $S_{MF1}$ or $S_{MF2}$ produced by the switch 48d to move the focal plane of the projection lens unit 68. The second signal generator circuit 186 is connected to the detector unit 84 and is not only operative to activate each of the CCD arrays 156, 158 and 160 of the detector unit 84 but responsive to the signals $S_F$ produced from the charge-coupled devices of each CCD array. The third signal generator circuit 188 is responsive to the pulse signal $S_{FD}$ from the rotary-shaft encoder 150 and indicative of the axial position of the focusing lens element forming part of the projection lens unit 68 and accordingly of the focal plane currently achievable by the lens unit 68. The signal $S_{FD}$ supplied from the rotary-shaft encoder 150 is shaped into an appropriate waveform by this third signal generator circuit 188 and is, upon amplification, supplied to the central processing unit 182 through the input/output interface circuit 182.

The motor drive/control circuit 190 is electrically connected to the focus control gear drive motor 148 forming part of the second lens drive assembly 149 (FIG. 6). The motor 148 is thus initiated into motion in response to a first motor actuation signal $S_{MA1}$ or a second motor actuation signal $S_{MA2}$ each of, for example, logic "1" state supplied from the central processing unit 164 through the input/output interface circuit 182.

As will be described in more detail, the first motor actuation signal $S_{MA1}$ is effective to actuate the focus control gear drive motor 148 into operation to drive the focus control gear 120 for rotation in one direction so that the focusing lens element forming part of the projection lens unit 68 is axially moved in the direction of arrow f (FIG. 6). This direction of movement of the focusing lens element will be herein referred to as first direction of movement of the lens element. On the other hand, the second motor actuation signal $S_{MA2}$ is effective to actuate the focus control gear drive motor 148 into operation to drive the focus control gear 120 for rotation in the other direction so that the focusing lens element is axially moved in the direction of arrow f' (FIG. 6). This direction of movement of the focusing lens will be herein referred to as second direction of movement of the lens element.

The motor actuation signal $S_{MA1}$ or $S_{MA2}$ of logic "1" state thus effective to move the focusing lens element in the first or second direction toward or away from the microfiche F may be output from the central processing unit 162 either in response to the manual focus control signal $S_{MF1}$ or $S_{MF2}$, respectively, supplied to the first signal generator 184 or on the basis of the signal $S_{AF}$ supplied from the automatic focus control mode select switch 48c on the control panel 42.

On the other hand, the read/print control section of the control circuit 162 as illustrated in FIG. 10B comprises a read/print control central processing unit 192 connected through a bidirectional bus 194 to the automatic focus control central processing unit 164. The read/print control central processing unit 192 is further connected through a bidirectional bus 196 to a read-only memory 198 and a random-access memory 200 and through a bidirectional bus 202 to an input/output interface buffer 204 as shown. The random-access memory 200 is also provided with a backup power supply source 205 as shown.

The input/output interface buffer 204 in turn is connected to signal generators respectively connected to the various detector devices provided in the apparatus embodying the present invention. These signal generators include a carrier complete state signal generator 206 connected to the photocoupling device 110 provided in association with the microfiche carrier assembly 52. The carrier complete state state signal generator 206 is thus responsive to the carrier complete state signal $S_{CC}$ of logic "0" or "1" state output from the photocoupling device 110 and amplifies the supplied signal $S_{CC}$ when the microfiche handling unit 44 is correctly assembled to the housing structure 30 and accordingly the apparatus is ready to start operation. The signal generator 206 amplifies the supplied signal $S_{CC}$ and passes the resultant signal to the central processing unit 192 via the interface buffer 204.

The detector devices provided in association with the read/print control central processing unit 192 further include a lens exchange signal generator 208 connected to the lens assembly detector 151 provided in association with the projection lens unit 68 (FIG. 6). The lens exchange signal generator 208 receives the signal $S_{LP}$ of logic "0" or "1" state from the lens assembly detector 151 and amplifies the supplied signal $S_{LP}$ when the lens assembly 119 including the projection lens unit 68 is correctly positioned in the lens casing 122. The amplified signal $S_{CC}$ is also supplied to the central processing unit 192 via the interface buffer 204.

In association with the read/print control central processing unit 192 is further provided a search state signal generator 210 for the microfiche carrier assembly 52. The search state signal generator 210 is responsive to the movement of each of the x-axis and y-axis linear motors 90 and 92 and is thus adapted to monitor the operative state of the microfiche carrier assembly 52 (FIG. 5) in search of a desired image frame on the microfiche F loaded into the microfiche carrier assembly 52. The search state signal generator 210 may thus be responsive to the activated or de-activated state of the x-axis and y-axis drive means associated with the x-axis and y-axis linear motors 90 and 92, respectively. In response to at least one of the x-axis and y-axis linear motors 90 and 92 being driven for movement, the search state signal generator 210 outputs a signal $S_{SC}$ indicating that an operation to search for an image frame of the microfiche in use is currently in progress. The signal $S_{SC}$ thus output from the search state signal generator 210 is also supplied through the input/output interface buffer 204 to the central processing unit 192.

Further provided in association with the read/print control central processing unit 192 are first, second and third switch state signal generators 212, 214 and 216. The first switch state signal generator 212 is responsive to the signal $S_{PS}$ output from the print start switch 48a to start a cycle of printing operation. The second switch state signal generator 214 is responsive to the signal zoom-in or zoom-out signal $S_{ZI}$ or $S_{ZO}$ output from the zoom-in/zoom-out control switch 48b to zoom in or out a frame of images on display. The third switch state signal generator 216 is an automatic focus control mode select detector responsive to the signal $S_{AF}$ output from the automatic focus control mode select switch 48c on the control panel 42 (FIG. 2). The third switch state signal generator 216 is thus operative to detect an automatic mode of focus control operation selected by the switch 48c. The signal output from each of these switch state signal generators 212, 214 and 216 is also supplied through the input/output interface buffer 204 to the central processing unit 192.

The input/output interface buffer 204 is further connected to a mirror drive control circuit 218 connected to the drive means for the rockable reflector mirror 70 (FIGS. 3 and 4) provided in the optical system of the apparatus embodying the present invention. The mirror drive control circuit 218 is operative to output a signal for actuating the rockable reflector mirror 70 into motion to turn about the axis of the shaft 72 in either direction indicated by arrowheads p and r in FIG. 4. Such a mirror drive control circuit 218 may include a sensor for detecting the position of the rockable reflector mirror 70, though not shown in the drawings. Further connected to the input/output interface buffer 204 is a printer control circuit 220 connected to the drive means for driving and activating the photosensitive drum 82 and the various associated actuators which form part of the printer module of the apparatus embodying the present invention.

Figure 11A:
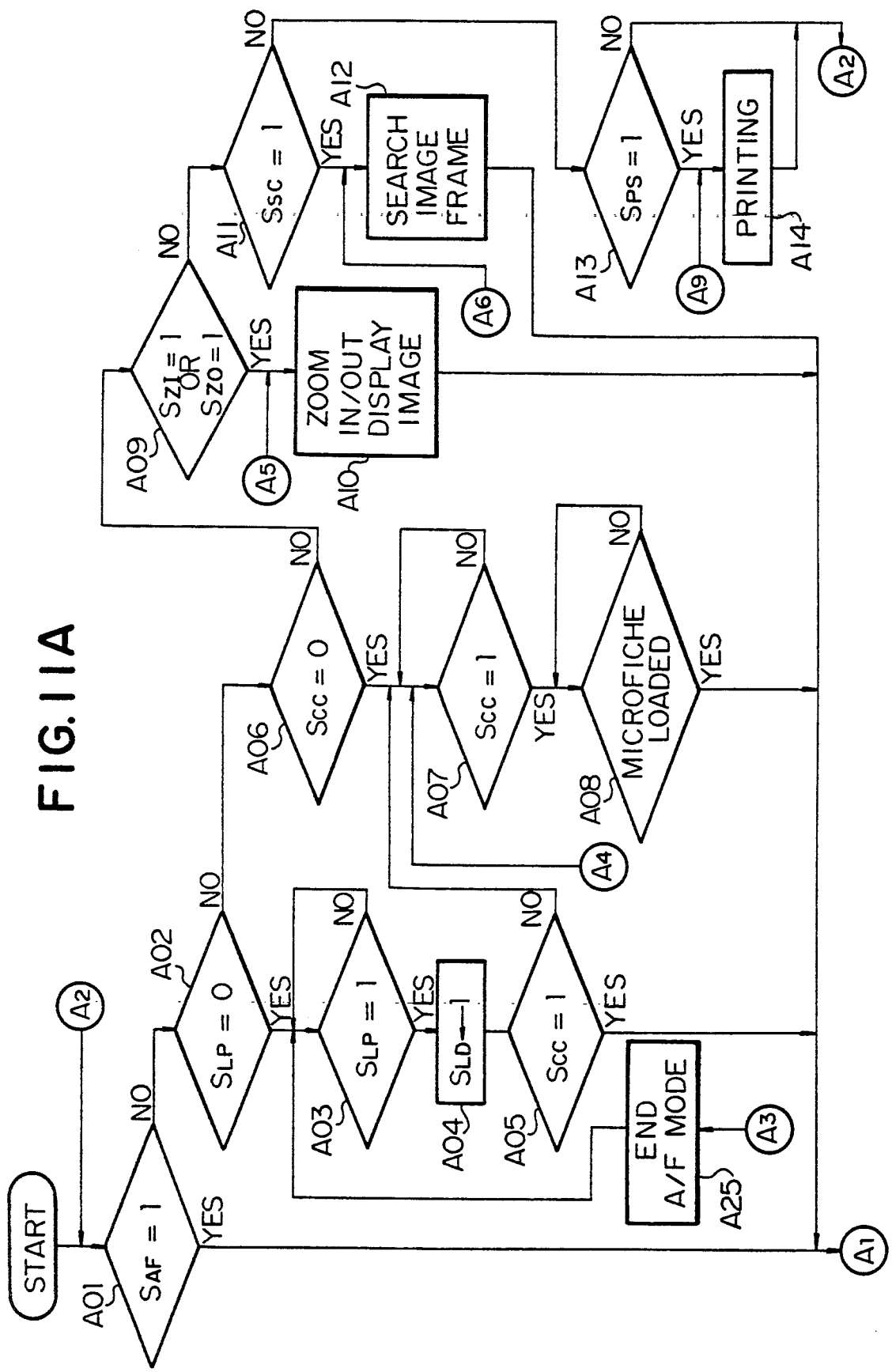
Figure 11C:
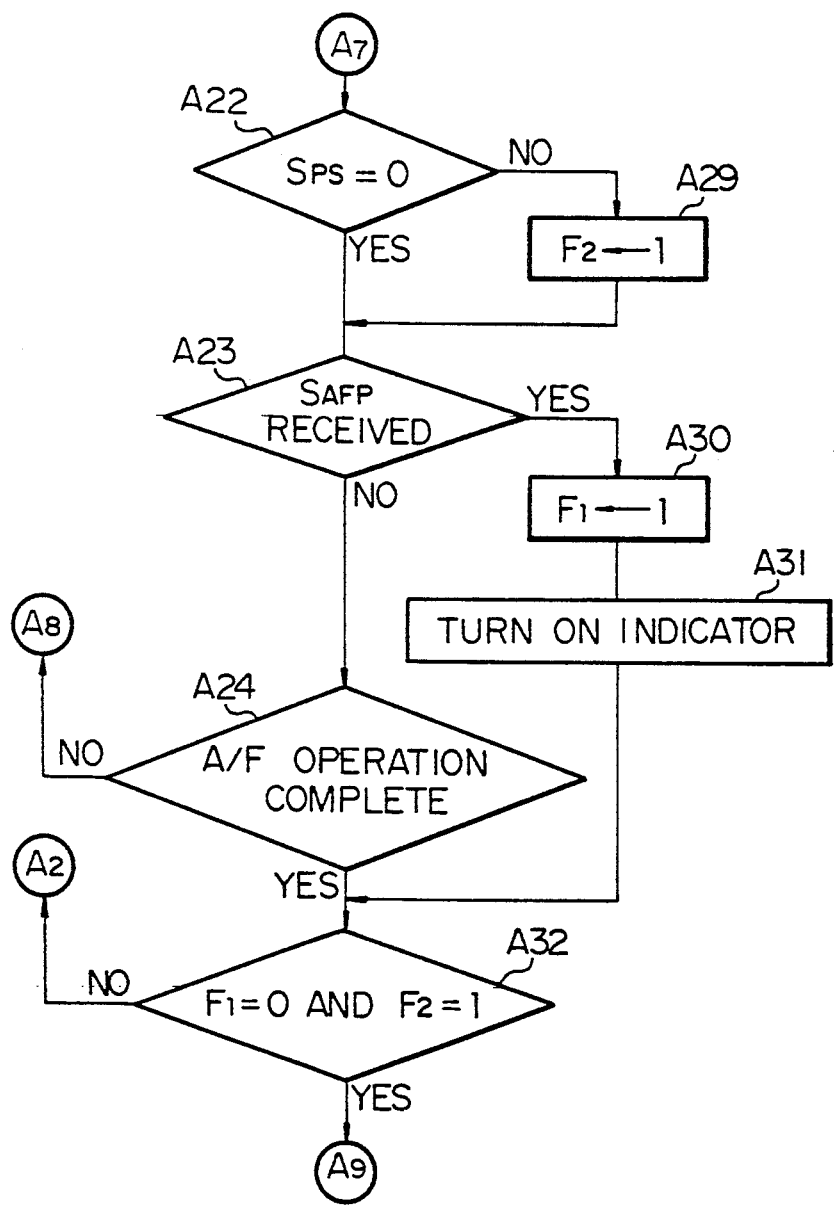

FIGS. 11A, 11B and 11C show an example of the routine program which may be executed by the read/print control central processing unit 192 in the control circuit 162 hereinbefore described with reference to FIGS. 10A and 10B.

The execution of the routine program illustrated in FIGS. 11A to 11C is started when the apparatus is switched in and the central processing unit 192 proceeds to step A01 to check if there is present the signal $S_{AF}$ of, for example, logic "1" state produced with the automatic focus control mode select switch 48c depressed on the control panel 42. This decision is made through the third switch state signal generator 216 connected to the central processing unit 192. In the presence detected of such a signal $S_{AF}$, the answer for the step A01 is given in the affirmative, in which instance the central processing unit 192 proceeds to the step shown in FIG. 11B.

On the other hand, if it is found at step A01 that there is not present the signal $S_{AF}$ of logic "1" state, the answer for the step A01 is given in the negative and, in this instance, the central processing unit 192 proceeds to step A02. At step A02 is checked if there is present the signal $S_{LP}$ of, for example, logic "0" state output from the lens assembly detector 151 (FIG. 6) connected to the lens exchange signal generator 208. The signal $S_{LP}$ of logic "0" state indicates that the lens assembly 119 including the projection lens unit 68 is not positioned in the lens casing 122.

If it is found at step A02 that the signal $S_{LP}$ of logic "0" state is present and accordingly the answer for the step A02 is given in the affirmative, the central processing unit 192 proceeds to step A03 to check if there is present the signal $S_{LP}$ of logic "1" state. The signal $S_{LP}$ of logic "1" state indicates that the lens assembly 119 is correctly positioned in the lens casing 122. The step A03 is repeated until the answer for the step turns affirmative. When the answer for the step A03 is thus given in the affirmative, the central processing unit 192 determines that a new lens assembly 119 has been installed into the apparatus after the absence of a lens assembly was detected at step A02. In this instance, the central processing unit 162 proceeds to step A04 to generate a lens drive signal $S_{LD}$ of logic "1" state effective to actuate into movement the focusing lens element forming part of the projection lens unit 68. The lens drive signal $S_{LD}$ generated in the central processing unit 192 is transmitted through the bus 194 to the automatic focus control central processing unit 164.

After the lens drive signal $S_{LD}$ of logic "1" state is thus transmitted to the central processing unit 164 at step A04, the central processing unit 192 proceeds to step A05 to check if there is present the carrier complete state signal $S_{CC}$ of, for example, logic "1" state output from the photocoupling device 110 provided in association with the microfiche carrier assembly 52 and connected to the carrier complete state signal generator 206. The carrier complete state signal $S_{CC}$ of logic "1" state indicates that the microfiche handling unit 44 incorporating the microfiche carrier assembly 52 is correctly assembled to the housing structure 30 so that the apparatus is ready to start operation. In the presence detected of the carrier complete state signal $S_{CC}$ of logic "1" state so that the answer for the step A05 is given in the affirmative, the central processing unit 192 proceeds the steps illustrated in FIG. 11B.

If it is found at step A02 that there is no signal $S_{LP}$ of logic "0" state, it is determined that the lens assembly 119 is correctly positioned within the lens assembly. The answer for the step A02 being thus given in the negative, the central processing unit 192 proceeds to step A06 to check if there is present the signal $S_{CC}$ of, for example, logic "0" state. The carrier complete state signal $S_{CC}$ of logic "0" state indicates that the microfiche handling unit 44 incorporating the microfiche carrier assembly 52 is not assembled to the housing structure 30.

If the answer for the step A06 is given in the affirmative, the central processing unit 192 proceeds to step A07 to check if there is present the signal $S_{CC}$ of logic "1" state output from the photocoupling device 110. The carrier complete state signal $S_{CC}$ of logic "1" state indicates that the microfiche handling unit 44 incorporating the microfiche carrier assembly 52 is correctly assembled to the housing structure 30 so that the apparatus is ready to start operation. The step A07 is followed also when it is detected at step A05 that the carrier complete state signal $S_{CC}$ is of logic "1" state. The step A07 is repeated until the answer for the step turns affirmative. When the answer for the step A07 is thus given in the affirmative, the central processing unit 192 proceeds to step A08 to detect if there is a microfiche F loaded into the microfiche carrier assembly 52 in the microfiche handling unit 44 assembled to the housing structure 30. This step A08 is also repeated until the answer for the step turns affirmative and, when the answer for the step A08 is given in the affirmative, the central processing unit 192 proceeds to the steps shown in FIG. 11B.

If it is found that there no signal $S_{CC}$ of logic "0" state, it is determined that the microfiche handling unit 44 incorporating the microfiche carrier assembly 52 is correctly assembled to the housing structure 30. The answer for the step A06 being thus given in the negative, the central processing unit 192 proceeds to step A09 to check if there is present the zoom-in or zoom-out signal $S_{ZI}$ or $S_{ZO}$ of, for example, logic "1" state produced with the zoom-in/zoom-out control switch 48b depressed on the control panel 42. This decision is made through the second switch state signal generator 214 connected to the central processing unit 192.

If it is found at step A09 that there is the zoom-in or zoom-out signal $S_{ZI}$ or $S_{ZO}$ of logic "1" state and accordingly the answer for the step A09 is given in the affirmative, the central processing unit 192 proceeds to step A10 to generate a signal effective to actuate the zoom control gear drive motor 136 in the first lens drive assembly 137 for the projection lens unit 68. With the rotation of the output shaft of the motor 136 in the direction of arrow d or d' (FIG. 6), the zooming lens element which forms part of the projection lens unit 68 is driven for axial movement in the direction of arrow f or f' so that the image frame on display is either zoomed in or zoomed out. Subsequently to the step A10, the central processing unit 192 proceeds to the steps illustrated in FIG. 11B.

If it is found at step A09 that there is no zoom-in or zoom-out signal $S_{ZI}$ or $S_{ZO}$ of logic "1" state and accordingly the answer for the step A09 is given in the negative, the central processing unit 192 proceeds to step A11 to check if there is present the signal $S_{SC}$ of, for example, logic "1" state output from the search state signal generator 210. In the presence detected of the signal $S_{SC}$ of logic "1" state, the answer for the step A11 is given in the affirmative. In this instance, the central processing unit 192 proceeds to step A12 to generate signals effective to actuate the drive means associated with the x-axis linear motor 90 and/or the drive means associated with the y-axis linear motor 92 until a particular image frame of the microfiche F loaded into the microfiche carriage assembly 52 is moved to a position aligned with the path of light from the light source assembly 57 (FIG. 1). Subsequently to the step A12, the central processing unit 192 proceeds to the steps illustrated in FIG. 11B.

In the absence detected of the signal $S_{SC}$ of logic "1" state as so that the answer for the step A11 is given in the negative, the central processing unit 192 proceeds to step A13 to check if there is present the signal $S_{PS}$ of, for example, logic "1" state produced with the print start switch 48a depressed on the control panel 42. This decision is made through the first switch state signal generator 212 connected to the central processing unit 192. In the absence detected of such a signal $S_{PS}$ and accordingly the answer for the step A13 is given in the negative, the central processing unit 192 reverts to step A01 to check if there is present the automatic focus mode control mode select signal $S_{AF}$ of logic "1".

On the other hand, if it is found at step A13 that there is the signal $S_{PS}$ of logic "1" state and accordingly the answer for the step A13 is given in the affirmative, the central processing unit 192 proceeds to step A14 to generate printer control signals effective to initiate the photosensitive drum 82 and associated actuators into motion to perform a cycle of printing operation. The signals thus generated by the central processing unit 192 are supplied through the input/output interface buffer 204 to the printer control circuit 218, which are accordingly enabled to output various driver signals to the drum 82 and associated actuators included in the printer module of the apparatus. Subsequently to step A14, the central processing unit 192 reverts to step A01.

Thus, when the answer for any of the steps A01, A05 and A08 is given in the affirmative or subsequently to the step A10 or A12, the central processing unit 192 proceeds to step A15 illustrated in FIG. 11B. At this step A15 are reset first and second control flags $F_1$ and $F_2$. The first control flag $F_1$ is, when set to logic "1" state, indicative of the fact that the automatic mode of focus control is inoperable and the second control flag $F_2$ is, when set to logic "1" state, indicative of the state in which the print start switch 48a on the control panel 42 is depressed to start a cycle of printing operation. The step A15 is followed by step A16 at which the central processing unit 192 issues an instruction signal effective to turn off the indicator 48e which is to be activated to illuminate or flicker when the automatic mode of focus control is inoperable.

Subsequently to step A17, the central processing unit 192, proceeds to step A17 to generate an instruction signal effective to start the automatic mode of focus control operation. The automatic focus control mode start signal is transferred through the bus 194 to the automatic focus control central processing unit 164, which is accordingly enabled to start the automatic focus control operation and execute various steps to automatically control the focal plane achievable by the projection lens unit 68. The steps thus executed by the central processing unit 164 for performing the automatic mode of focus control operation will be hereinafter described in detail.

While the automatic focus control operation is in progress under the control of the automatic focus control central processing unit 164, the read/print control central processing unit 192 executes a series of steps A18 to A24 until it is informed from the automatic focus control central processing unit 164 that the automatic focus control operation is complete.

At step A18 is detected whether or not the signal $S_{LP}$ output from the lens assembly detector 151 is of logic "1" state indicating that the lens assembly 119 is correctly positioned in the lens casing 122. If the projection lens unit 68 is exchanged with a lens having another focal distance while the central processing unit 164 is in operation for adjusting the focal plane to be achieved by the lens unit 68 which has been disassembled from the apparatus, it is useless for the central processing unit 164 to continue the automatic focus control operation for the lens unit 68. Thus, if it is found at step A18 that the signal $S_{LP}$ is not of logic "1" state and accordingly the answer for the step A18 is given in the negative, the central processing unit 192 proceeds to step A25 to generate an instruction signal effective to terminate the automatic mode of focus control operation. This automatic focus control mode end signal is transferred through the bus 194 to the automatic focus control central processing unit 164. Subsequently to the step A25, the central processing unit 192 proceeds to step A03 to repeatedly check if the signal $S_{LP}$ is of logic "1" state until it is confirmed that the lens assembly 119 is correctly assembled to the casing 122.

When it is thereafter found that the new lens assembly is fitted to the casing 122, the answer for the step A03 turns affirmative so that, provided it is found at step A05 that the microfiche handling unit 44 is properly assembled to the housing structure 30, the central processing unit 192 requests the automatic focus control central processing unit 164 to start the automatic focus control operation as at step A17 after the lens drive signal $S_{LD}$ of logic "1" state is generated at step A04.

When it is found at step A18 that there is present the signal $S_{LP}$ of logic "1" state while the automatic focus control operation is thus in progress, the answer for the step A18 is given in the affirmative, the central processing unit 192 proceeds to step A19 to check if the carrier complete state signal $S_{CC}$ output from the photocoupling device 110 is of logic "1" state indicating that the microfiche handling unit 44 incorporating the microfiche carrier assembly 52 is correctly assembled to the housing structure 30. If the microfiche handling unit 44 is exchanged with a handling unit of another type such as of the type using a continuous length of microfilm packed in roll form while the automatic focus control operation is in progress under the control of the central processing unit 164, it is also useless for the central processing unit 164 to continue the automatic focus control operation for the lens unit 68. Thus, if it is found at step A19 that there is no signal $S_{CC}$ of logic "1" state and the answer for the step A19 is given in the negative, the central processing unit 192 proceeds to step A26 to generate an instruction signal effective to terminate the automatic mode of focus control operation and transmit the signal to the automatic focus control central processing unit 164. Subsequently to the step A26, the central processing unit 192 proceeds to step A07 to repeatedly check if the signal $S_{CC}$ is of logic "1" state until it is confirmed that the microfiche handling unit 44 is correctly assembled to the housing structure 30.

When it is thereafter found that the new microfiche handling unit is assembled to the apparatus, the answer for the step A07 turns affirmative so that, provided it is found at step A08 that there is a microfilm loaded into the microfiche carrier assembly in the new microfilm handling unit, the central processing unit 192 also requests the automatic focus control central processing unit 164 to start the automatic focus control operation as at step A17.

If it is found at step A19 that there is present the signal $S_{CC}$ of logic "1" state while the automatic focus control operation is in progress, the answer for the step A19 is given in the affirmative. In this instance, the central processing unit 192 proceeds to step A20 to check if neither the zoom-in signal $S_{ZI}$ nor the zoom-out signal $S_{ZO}$ of logic "1" state is currently produced with the zoom-in/zoom-out control switch 48b depressed on the control panel 42. If the zoom-in/zoom-out control switch 48b is depressed while the automatic focus control operation is in progress under the control of the central processing unit 164, it is also useless for the central processing unit 164 to continue the automatic focus control operation for the lens unit 68. Thus, if it is found at step A20 that there is the zoom-in or zoom-out signal $S_{ZI}$ or $S_{ZO}$ of logic "1" state and accordingly the answer for the step A20 is given in the negative, the central processing unit 192 proceeds to step A27 to generate an instruction signal effective to terminate the automatic mode of focus control operation and transmits the signal to the automatic focus control central processing unit 164. Subsequently to the step A27, the central processing unit 192 proceeds to step A10 to generate a signal effective to drive the zooming lens element of the projection lens unit 68 for axial movement in the direction of arrow f or f' for zooming in or out the image frame on display. The central processing unit 192 thereafter requests the automatic focus control central processing unit 164 to start the automatic focus control operation as at step A17.

If it is found at step A20 that neither the zoom-in signal $S_{ZI}$ nor the zoom-out signal or $S_{ZO}$ of logic "1" state is present while the automatic focus control operation is in progress, the answer for the step A20 is given in the affirmative. In this instance, the central processing unit 192 proceeds to step A21 to check if there is no signal $S_{SC}$ of logic "1" state output from the search state signal generator 210. In the presence detected of the signal $S_{SC}$ of logic "1" state, the answer for the step A11 is given in the negative, in which instance the central processing unit 192 proceeds to step A28 to generate an instruction signal effective to terminate the automatic mode of focus control operation and transmits the signal to the automatic focus control central processing unit 164. Subsequently to the step A28, the central processing unit 192 proceeds to step A12 to generate signals effective to drive the x-axis linear motor 90 and/or y-axis linear motor 92 for movement so that a particular image frame of the microfiche F in use is aligned with the path of light from the light source assembly 57 (FIG. 1). The central processing unit 192 thereafter requests the automatic focus control central processing unit 164 to start the automatic focus control operation as at step A17.

If it is found at step A21 that there is no signal $S_{SC}$ of logic "1" state and the answer for the step A21 is given in the affirmative, the central processing unit 192 proceeds to step A22 to check if there is no signal $S_{PS}$ of logic "1" state produced with the print start switch 48a depressed on the control panel 42. In the presence detected of such a signal $S_{PS}$ and accordingly the answer for the step A22 is given in the negative, the central processing unit 192 proceeds to step A29 to set the second control flag $F_2$ to logic "1" state.

Subsequently to step A29 or if it is found at step A22 that there is no signal $S_{PS}$ of logic "1" state currently present and accordingly the answer for the step A22 is given in the affirmative, the central processing unit 192 proceeds to step A23 to check if there is received from the automatic focus control central processing unit 164 an automatic focusing mode prohibit signal $S_{AFP}$ indicating that the automatic mode of focus control is inoperable. If it is found at this step A23 that such a signal $S_{AFP}$ is received from the central processing unit 164, the read/print control central processing unit 192 proceeds to step A30 to set the first control flag $F_1$ to logic "1" state and further to step A31 to issue an instruction signal effective to turn on the indicator 48e to indicate that the automatic mode of focus control operation is currently inoperable.

On the other hand, in the absence of the signal $S_{AFP}$ received from the central processing unit 164, the answer for the step A23 is given in the negative. In this instance, the steps A30 and A31 are skipped over and the step A23 is followed by step A24. At this step A24 is tested whether or not there is received from the automatic focus control central processing unit 164 a signal indicating that the automatic focus control operation which has been, in progress is complete. If it is found that there is not such a signal received from the central processing unit 164, the read/print central processing unit 192 reverts to step A18 and may recycles the series of steps A18 to A24 until the answer for the step A24 turns affirmative.

When it is thereafter found at step A24 that a signal indicating the termination of the automatic focus control operation is received from the central processing unit 164 or the indicator 48e is turned on at step A31, the central processing unit 192 proceeds to step A32 to check if the first control flag $F_1$ reset at logic "0" state and the second control flag $F_2$ is set at logic "1" state. In the absence of the print start signal $S_{PS}$ of logic "1" state, the answer for the step A22 is given in the affirmative and the step A29 is skipped over so that the second control flag $F_2$ remains in the logic "0" state. Under this condition, the answer for this step A32 is given in the negative so that the central processing unit 192 reverts to step A01 and may reiterate the routine program for a second time. The central processing unit 192 may thus repeat the loop of the steps A01, A02, A06, A09, A11, A13 and A01.

When the print start switch 48a on the control panel 42 is depressed and the print start signal $S_{PS}$ of logic "1" state is produced while the central processing unit 192 is in operation repeating the loop of the steps A01, A02, A06, A09, A11, A13 and A01. In this instance, the answer the step A13 turns affirmative so that the central processing unit 192 proceeds to step A14 to initiate the photosensitive drum 82 and associated actuators into motion to perform a cycle of printing operation as previously noted.

Furthermore, when the print start signal $S_{PS}$ of logic "1" state is produced while the central processing unit 192 is in operation repeating the loop of the steps A18 to A24, the answer the step A22 turns affirmative so that the central processing unit 192 proceeds to step A29 to set the second control flag $F_2$ to logic "1" state as above noted. In this instance, the answer for the step A32 is given in the affirmative unless it is found at step A23 that there is received from the automatic focus control central processing unit 164 a signal $S_{AFP}$ indicating that the automatic mode of focus control is inoperable. The central processing unit 192 thus proceeds to step A14 to perform a cycle of printing operation. Subsequently to step A14, the central processing unit 192 also proceeds to step A01 and may reiterate the routine program for a second time.

As has been described, the central processing unit 164 terminates execution of the automatic focus control operation when the lens assembly 119 or the microfiche handling unit 44 is exchanged with another one while the automatic focus control operation is in progress under the control of the central processing unit 164. The central processing unit 164 also terminates execution of the automatic focus control operation when the zoom-in/zoom-out control switch 42 is depressed or the signal $S_{SC}$ of logic "1" state is output from the search state signal generator 210 during execution of the automatic focus control operation. On the other hand, the central processing unit 164 continues the focus control operation when the print start switch 48a is depressed while the automatic focus control operation is in progress. The read/print control central processing unit 192 starts execution of the printing operation (step A14) after the focus control operation is terminated (step A24). This principle of operation is adopted for the purpose that a printing operation is to be performed on completion of a focus control operation.

Such a principle of operation is however not followed when, for example, the image on the microfiche F located in the path of light has a prohibitively low degree of contrast and, for this reason, the automatic adjustment of the could not be made properly. On such an occasion, the automatic focus control central processing unit 164 determines at step A23 that the automatic mode of focus control is inoperable and transmits the previously mentioned automatic focusing mode prohibit signal $S_{AFP}$ to the read/print control central processing unit 192. In response to this signal $S_{AFP}$, the read/print control central processing unit 192 proceeds from step A23 to step A30 to set the first control flag $F_1$ to logic "1" state and further to step A31 to issue an instruction signal effective to turn on the indicator 48e to indicate that the automatic mode of focus control operation is currently inoperable. Thereafter, the central processing unit 194 proceeds from step A32 to step A01 to repeat the loop of steps A01, A02, A06, A09, A11, A13 and A01 until it is found at step A01 that the signal $S_{AF}$ of logic "1" state is produced with the automatic focus control mode select switch 48c depressed on the control panel 42. The indicator 48e turned on at step A31 is to be turned off at step A16 after it is found at step A01 that the print start switch 48a on the control panel 42 is depressed to start a cycle of printing operation.

As has been described above, the automatic focus control central processing unit 164 continues the focus control operation when the print start switch 48a is depressed while the automatic focus control operation is in progress. In addition, when it is determined by the central processing unit 164 that the automatic adjustment of the could not be made properly (step A23), the read/print central processing unit 194 proceeds from step A32 not to step A14 but to step A01 and as a consequence printing operation is not performed at step A14 if it is found that the print start switch 48a is depressed (step A22).

When the print start switch 48a is depressed while the central processing unit 192 is repeating the loop of steps A01, A02, A06, A09, A11, A13 and A01, the step A13 is followed not by the step A01 but by the step A14 to perform printing operation. In this instance, the operator of the apparatus must have depressed the print start switch 48a while knowing that the automatic mode of focus control is currently inoperable and, for this reason, the operator may have to adjust the focus through a manipulation of the manual focus control switch 48d on the control panel 42.

It may be noted that the automatic focus control operation is performed not only when the automatic focus control mode select switch 48c is depressed but in some other cases if the switch 48c is not depressed. These cases include a case where the lens assembly 119 is exchanged with another one (steps A02, A03, A04 and A05), a case where the microfiche handling unit 44 is exchanged with another one (steps A06, A07 and A08), and a case where the searching of an image frame is terminated (steps A11 and A12).

Figure 12:
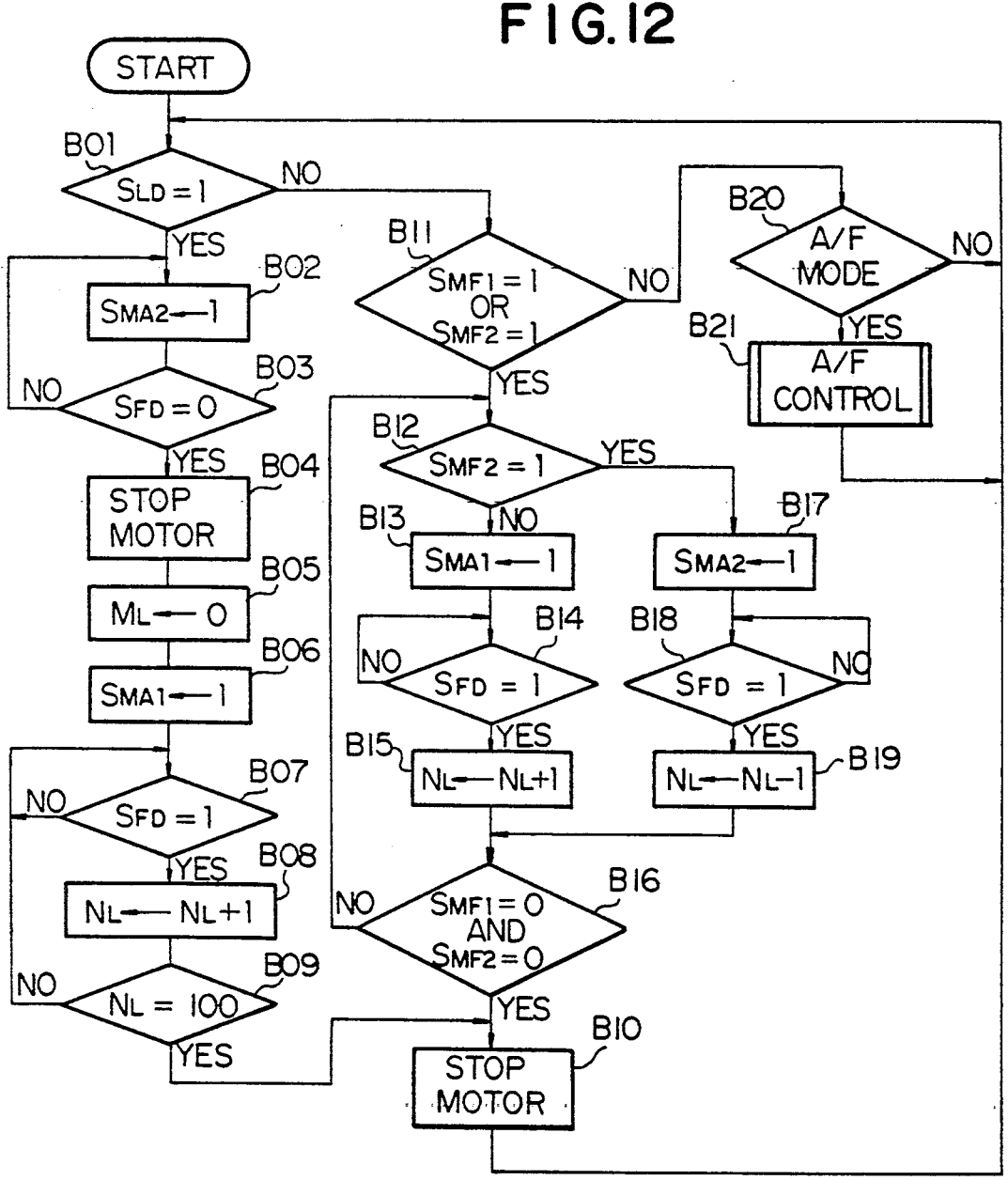
FIG. 12 is a flowchart showing an example of the main routine program which may be executed by the automatic focus control cpu included in the control circuit illustrated in FIGS. 10A and 10B.

FIG. 12 shows an example of the routine program which may be executed by the automatic focus control central processing unit 164 in the control circuit 162.

The execution of the routine program illustrated in FIG. 12 is also started when the apparatus is switched in and the central processing unit 164 proceeds to step B01 to check if there is present the lens drive signal $S_{LD}$ of logic "1" state received from the read/print control central processing unit 192. As has been noted, this lens drive signal $S_{LD}$ of logic "1" state is produced at step A04 of the routine program hereinbefore described with reference to FIGS. 11A to 11C. In the presence detected of the lens drive signal $S_{LD}$ of logic "1" state, the answer for the step B01 is given in the affirmative, in which instance the central processing unit 164 proceeds to step B02. At step B02, the central processing unit 164 generates the second motor actuation signal $S_{MA2}$ of logic "1" state effective to move the focusing lens element in the previously defined second direction away from the microfiche F in place. The second motor actuation signal $S_{MA2}$ is supplied through the input/output interface circuit 182 to the motor drive/control circuit 190 and actuates the focus control gear drive motor 148 into operation to drive the focus control gear 120 for rotation in a direction to move the focusing lens element in the second direction away from the microfiche F in place.

When the second motor actuation signal $S_{MA2}$ is thus generated and the focusing lens element forming part of the projection lens unit 68 is driven for movement in the second direction away from the microfiche F, the central processing unit 164 receives the pulse signal $S_{FD}$ supplied from the rotary-shaft encoder 150 (FIG. 6) and transmitted through the third signal generator circuit 188 to the central processing unit 164. The central processing unit 164 thus counts the number ($N_L$) of the pulses supplied as the pulse signal $S_{FD}$ from the rotary-shaft encoder 64 and the numbers of the pulses which appear at predetermined time intervals. The count $N_L$ of the pulses is stored in the memory 168 and is incremented each time a new pulse is received by the central processing unit 164. From the count $N_L$ of the pulses thus registered in the memory 168, the central processing unit 164 determines the speed at which the focus control gear 120 is being driven for rotation and the current angular position of the gear 120, that is, the speed at which the focusing lens element is being driven for axial movement and the current axial position of the lens element.

Figure 13:
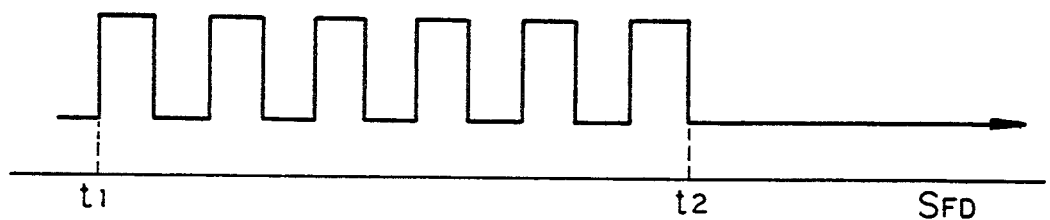
FIG. 13 is a diagram showing an example of the train of pulses which may be output from a rotary-shaft encoder provided for the detection of the focal plane achievable by the projection lens in the apparatus embodying the present invention.

FIG. 13 shows an example of the train of pulses supplied as the pulse signal $S_{FD}$ from the rotary-shaft encoder 64. The waveform appearing from time $t_1$ to time $t_2$ indicates that the focus control gear drive motor 148 is operating at a fixed speed and the waveform appearing after time $t_2$ indicates that the motor 148 is brought to a stop with the focusing lens element moved to a predetermined limit position close to one limit of the range of stroke of the lens element which is axially movable with respect to the microfiche F in place. As will be seen from this waveform of the pulse signal $S_{FD}$ from the rotary-shaft encoder 64, the signal $S_{FD}$ remains at low level after the focusing lens element has reached the predetermined limit position in the movable range of the lens element with respect to the microfiche F in place.

From the sustained low-level state of the pulse signal $S_{FD}$, the central processing unit 164 determines at step B03 that the focusing lens element has reached the limit position in the movable range of the lens element and accordingly the focus control gear drive motor 148 is to be brought to a stop. Thus, the central processing unit 164 then proceeds to step B04 to generate an instruction signal to bring the focus control gear drive motor 148 to a full stop. The step B04 is followed by step B05 at which the number of the pulses received by the third signal generator 188 and registered in the memory 168 as the count $N_L$ indicating the current axial position of the focus control lens element is reset to numerical value "0".

Subsequently to step B05, the central processing unit 164 proceeds to step B06 and generates the first motor actuation signal $S_{MA1}$ of logic "1" state effective to drive the focusing lens element for axial movement in the previously defined first direction toward the microfiche F in place. The first motor actuation signal $S_{MA1}$ is supplied through the input/output interface circuit 182 to the motor drive/control circuit 190 and actuates focus control gear drive motor 148 into operation to drive the focus control gear 120 for rotation in a direction to drive the focusing lens element for axial movement in the first direction toward the microfiche F in place.

After the first motor actuation $S_{MA1}$ is thus generated, the central processing unit 164 checks at step B07 if there is a new pulse of high level appearing in the pulse signal $S_{FD}$ supplied from the rotary-shaft encoder 150. The central processing unit 164 thus increments at step B08 the count $N_L$ of the pulses registered in the memory 168 when a new pulse is found appearing in the pulse signal $S_{FD}$ from the rotary-shaft encoder 64. The central processing unit 164 then detects at step B09 whether or not the count $N_L$ of the pulses registered in the memory 168 has reached a predetermined numerical value of, for example, 100. Thus, the central processing unit 164 repeats the loop of the steps B06, B07 and B08 until the count $N_L$ of the pulses registered in the memory 168 reaches the predetermined numerical value.

Figure 14:
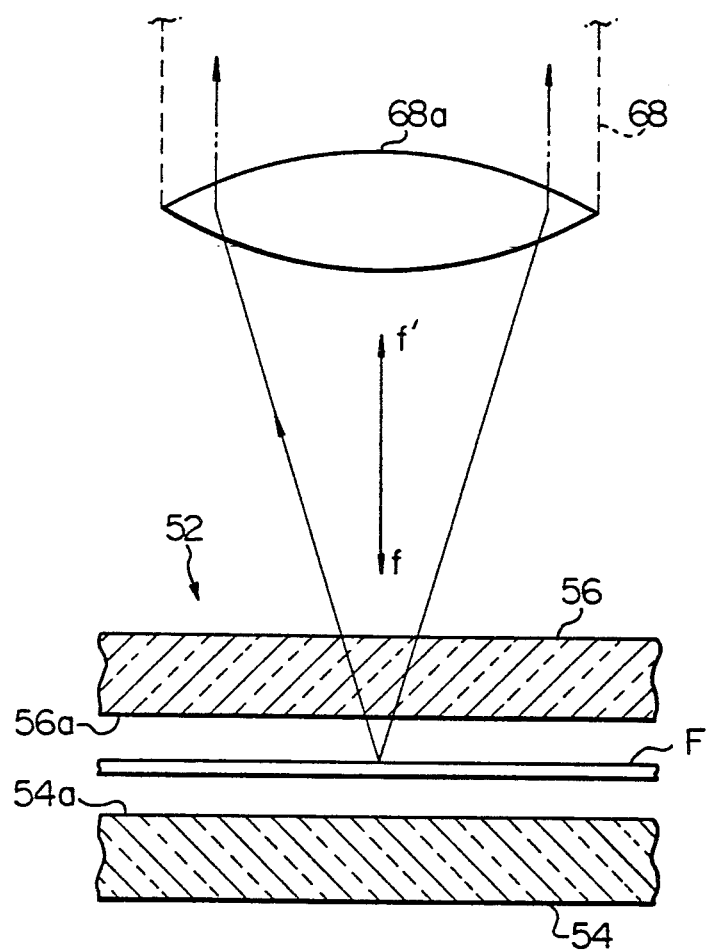
FIG. 14 is a fragmentary side elevation view showing part of a microfiche carrier assembly included in the apparatus embodying the present invention as illustrated in FIG. 3.

To explain the significance of the count $N_L$ of pulses detected in this step A09, reference will be for the time being made to FIG. 14 which shows part of the microfiche carrier assembly 52 included in the apparatus embodying the present invention.

As has been described with reference to FIG. 3, the microfiche carrier assembly 52 used in the apparatus embodying the present invention includes the transparent microfiche holder plates 54 and 56 which are vertically spaced apart in parallel from each other. A beam of light transmitted through the microfiche F and thus carrying image information picked up from any image frame recorded on the microfiche F is passed through the cylindrical projection lens unit 68 which is herein represented by a focusing lens element 68a. In the arrangement shown in FIG. 14, the focusing lens element 68a of the projection lens unit 68 is movable in the first direction toward the microfiche F as indicated by arrow f and the second direction away from the microfiche F as indicated by arrow f'. As has been noted, the lens element 68a is driven to move in the direction of arrow f in response to the first manual focus control signal $S_{MF1}$ or the first motor actuation signal $S_{MA1}$ of logic "1" state and in the direction of arrow f' in response to the second manual focus control signal $S_{MF2}$ or the second motor actuation signal $S_{MA2}$ of logic "1" state.

With the shown arrangement of the microfiche holder plates 54 and 56 and the focusing lens element 68a forming part of the projection lens unit 68, the focusing lens element 68a must have its focal plane located between the upper face 54a of the lower holder plate 54 and the lower face 56a of the upper holder plate 56. Assume now that the projection lens unit 68 is exchanged with another lens unit and is axially positioned so that the focusing lens element 68a of the new lens unit is located between the faces 54a and 56a of the holder plates 54 and 56. In this instance, the location of the focal plane of the lens element 68a will be sufficiently close to the plane on which the focal plane of the lens element 68a should be located, that is, the plane on which the selected image frame of the microfiche F is to be picked up by the beam travelling through the microfiche F to the lens element 68a. Thus, locating the focal plane of the lens element 68a between the holder plates 54 and 56 lends itself to precluding the formation of an out-of-focus image on the viewing screen 38 and will make it possible to assuredly control the degree of contrast of the automatically focus controlled image.

Thus, in the apparatus embodying the present invention, the projection lens unit 68 newly assembled into the apparatus is automatically positioned so that the focusing lens element 68a has its focal plane located between the opposite faces 54a and 56a of the lower and upper holder plates 54 and 56, respectively. The predetermined numerical value 100 of the count $N_L$ of pulses is such that the particular numerical value corresponds to the axial position of the lens unit 68 having the focal plane of the focusing lens element 68a located on the lower face 56a of the upper holder plate 56. Such a position of the focusing lens element 68a forming part of the projection lens unit 68 is herein referred to as reference position of the lens element 68a.

It may be noted that the count $N_L$ of the pulses to be supplied from the rotary-shaft encoder 150 increases as the focusing lens element 68a is moved in the first direction toward the microfiche F in place and decreases as the focusing lens element 68a is moved in the second direction away from the microfiche F.

Thus, when it is found at step B09 that the count $N_L$ of the pulses registered in the memory 168 associated with the automatic focus control central processing unit 164 has reached the predetermined numerical value of 100, the central processing unit 164 determines that the focusing lens element 68a of the projection lens unit 68 is moved to its axial reference position having the focal plane located on the lower face 56a of the upper holder plate 56. After the focus control gear drive motor 148 is initiated into operation at step B06, the automatic focus control central processing unit 164 repeats the loop of the steps B06 to B09 until it is found at step B09 that the count $N_L$ of pulses stored in the memory 168 has reached the predetermined numerical value of 100 and accordingly the focal plane of the focusing lens element 68a is located on the lower face 56a of the upper holder plate 56.

When it is determined at step B09 that the focal plane of the focusing lens element 68a is located on the lower face 56a of the upper holder plate 56 and thus the answer for the step B09 is given in the affirmative, the automatic focus control central processing unit 164 proceeds to step B10 to generate as instruction signal to bring the focus control gear drive motor 148 to a full stop.

It will be understood from the foregoing description that, through execution of the steps B02 to B05, the projection lens unit 68 or, more particularly, the focusing lens element 68a is moved to the predetermined limit position close to one limit of the range of stroke of the lens element 68a. Through execution of the subsequent steps B06 to B10, the focusing lens element 68a which has thus once moved to the predetermined limit position thereof is moved to is axial reference position having the focal plane located on the lower face 56a of the upper holder plate 56.

The step B10 is followed by the step B01 at which the central processing unit 164 checks if there is present the lens drive signal $S_{LD}$ of logic "1" state received from the read/print control central processing unit 192. In the absence detected of the lens drive signal $S_{LD}$ of logic "1" state, the answer for the step B01 is given in the negative, in which instance the central processing unit 164 proceeds to step B11.

At step B11 is checked if there is present the first manual focus control signal $S_{MF1}$ or the second manual focus control signal $S_{MF2}$ of logic "1" state produced with the manual focus control switch 48d depressed on the control panel 42 of the apparatus. As has been described, the first manual focus control signal $S_{MF1}$ is effective to move the focusing lens element 68a in the first direction toward the microfiche F as indicated by arrow f in FIG. 14 and the second manual focus control signal $S_{MF2}$ is effective to move the focusing lens element 68a of the lens unit 68 in the second direction away from the microfiche F as indicated by arrow f' in FIG. 14.

If it is found at step B11 that there is present either the first manual focus control signal $S_{MF1}$ or the second manual focus control signal $S_{MF2}$ of logic "1" state and accordingly the answer for the step B11 is given in the affirmative, the central processing unit 164 proceeds to step B12 to check if it is the second manual focus control signal $S_{MF2}$ of logic "1" state that is detected to be present. If the answer for this step B12 is given in the negative, the central processing unit 164 determines that it is the first manual focus control signal $S_{MF1}$ of logic "1" state that is detected to be present. In this instance, the central processing unit 164 proceeds to step B13 to generate the first motor actuation signal $S_{MA1}$ of logic "1" state effective to drive the focusing lens element for axial movement in the first direction toward the microfiche F in place.

After the first motor actuation signal $S_{MA1}$ is thus generated at step B14, the central processing unit 164 checks at step B14 if there is a new pulse of high level appearing in the pulse signal $S_{FD}$ supplied from the rotary-shaft encoder 150. The central processing unit 164 thus increments at step B15 the count $N_L$ of the pulses stored in the memory 168 when a new pulse is found appearing in the pulse signal $S_{FD}$ from the rotary-shaft encoder 64. The central processing unit 164 then checks at step B16 if each of the first and second manual focus control signals $S_{MF1}$ and $S_{MF2}$ is of logic "0" state. If the answer for this step B16 is given in the affirmative, the central processing unit 164 determines that the manual focus control switch 48d is not currently depressed by the operator of the apparatus and proceeds to step B10 to generate an instruction signal to bring the focus control gear drive motor 148 to a full stop.

If it is found at step B16 that either the first manual focus control signal $S_{MF1}$ or the second manual focus control signal $S_{MF2}$ is of logic "0" state and accordingly the answer for this step B16 is given in the negative, the central processing unit 164 determines that the manual focus control switch 48d is depressed and reverts to step B12 to check if it is the second manual focus control signal $S_{MF2}$ of logic "1" state that is detected to be present, as above discussed.

If the answer for this step B12 is given in the affirmative, the central processing unit 164 determines that it is the second manual focus control signal $S_{MF2}$ of logic "1" state that is detected to be present. In this instance, the central processing unit 164 proceeds to step B17 to generate the second motor actuation signal $S_{MA2}$ of logic "1" state effective to drive the focusing lens element for axial movement in the second direction away from the microfiche F in place.

After the second motor actuation signal $S_{MA2}$ is thus generated, the central processing unit 164 checks at step B18 if there is a new pulse of high level appearing in the pulse signal $S_{FD}$ supplied from the rotary-shaft encoder 150. The central processing unit 164 thus decrements at step B19 the count $N_L$ of the pulses stored in the memory 168 when a new pulse is found appearing in the pulse signal $S_{FD}$ from the rotary-shaft encoder 64. The central processing unit 164 then checks at step B16 if each of the first and second manual focus control signals $S_{MF1}$ and $S_{MF2}$ is of logic "0" state as has been discussed.

On the other hand, if it is found at step B11 that there is present neither the first manual focus control signal $S_{MF1}$ nor the second manual focus control signal $S_{MF2}$ of logic "1" state and the answer for the step B11 is given in the negative, the central processing unit 164 proceeds to step B20 to check if there is an automatic lens drive signal received from the read/print control central processing unit 192. This automatic focus control mode start signal is generated in the read/print control central processing unit 192 and transmitted to the automatic focus control central processing unit 164 at step A17 of the routine program described with reference to FIGS. 11A to 11C. The automatic focus control central processing unit 164 is now enabled to start the automatic focus control operation through execution of an automatic focus control subroutine program B21. The steps forming the automatic focus control subroutine program B21 for performing the automatic mode of focus control operation will be hereinafter described with reference to FIGS. 15A, 15B, 15C and 15D.

The focus control subroutine program B21 is executed to enable the automatic focus control central processing unit 164 to determine, responsive to the signals $S_F$ supplied from the photosensitive focus detector unit 84, whether the light incident on the detector unit 84 is correctly focussed, under-focussed or over-focussed with respect to the light receiving plane $P_D$ of the detector unit 84.

Figure 16:
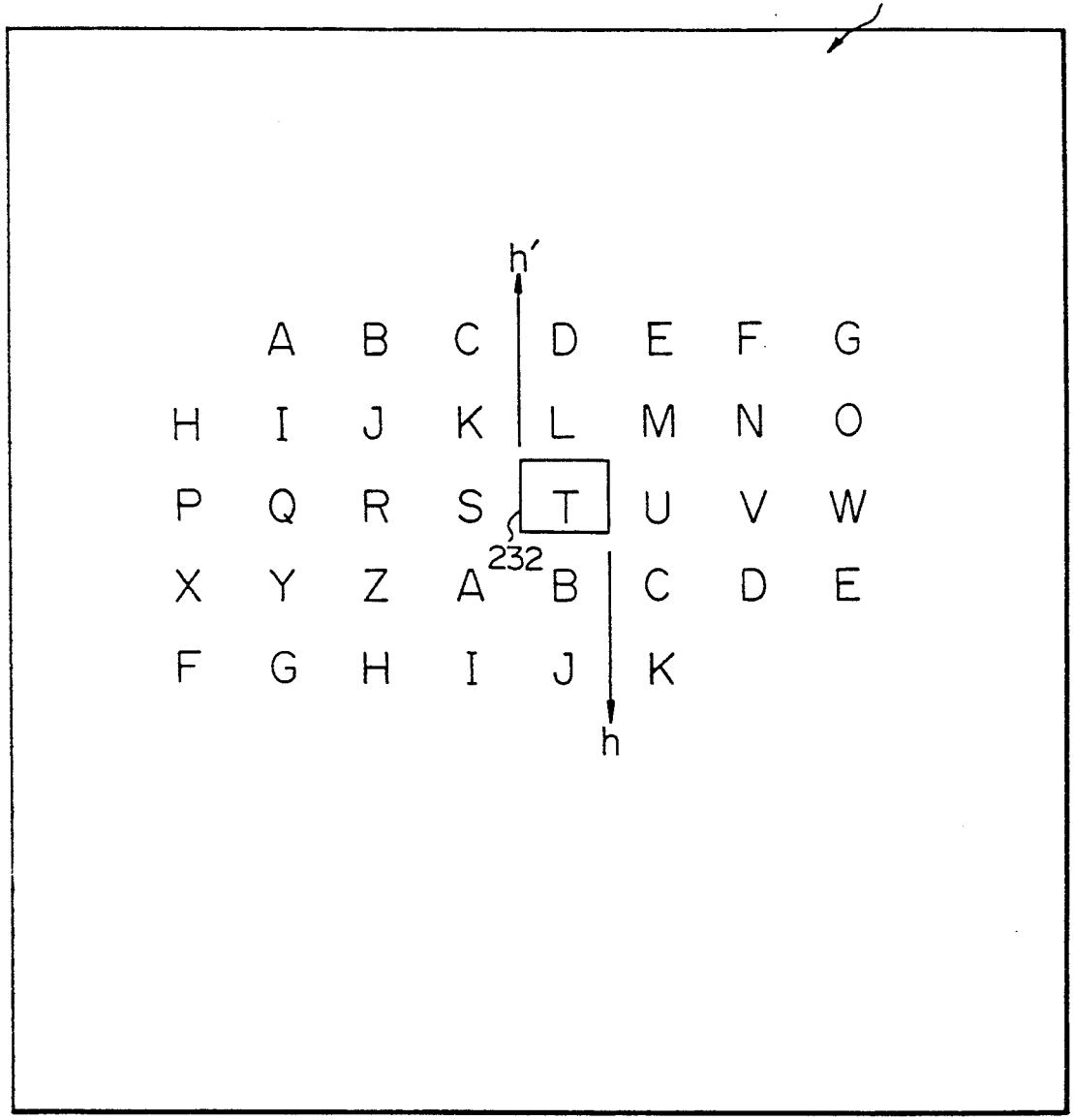
FIG. 16 is a plan view showing an example of an imaginary display area equivalent to the overall area of the viewing screen of the apparatus shown in FIGS. 1 and 3 and assumed to be produced at the light sensitive plane of a photosensitive focus detector unit.

Before entering into description of the focus control subroutine program B21, reference will be made to FIG. 16 which shows an example of an imaginary display area which is assumed to be located at the light sensitive plane $P_D$ in the photosensitive focus detector unit 84 with the rockable reflector mirror 70 turned in either of the directions p and r.

When the rockable reflector mirror 70 is driven to turn in the direction of arrow p or r about the axis of the shaft 72, an imaginary display area equivalent to the overall area of the viewing screen 38 and assumed to be located at the light receiving plane $P_D$ of the photosensitive focus detector unit 84 will be moved in any direction with respect to the light sensitive area of the detector unit 84. Thus, when the rockable reflector mirror 70 is caused to turn in the direction of arrow p or r about the axis of the pivot shaft 72 (FIG. 4), the imaginary display area, 230, equivalent to the overall area of the viewing screen 38 is moved vertically with respect to the light sensitive area, 232, of the photosensitive focus detector unit 84 as indicated in FIG. 16. In other words, the light sensitive area 232 of the photosensitive focus detector unit 84 is moved relative to the imaginary display area 230 vertically in a direction of arrow h or in a direction of arrow h', respectively, as shown in FIG. 16 when the reflector mirror 70 is driven to turn in the direction of arrowhead p or r, respectively, as shown in FIG. 4. When the rockable reflector mirror 70 has a certain angular position about the axis of the pivot shaft 72, the light sensitive area 232 of the detector unit 84 will be located centrally of the imaginary display area 230 in a vertical direction of the area 230 as indicated by full lines in FIG. 16. Prior to the start of the focus control subroutine program B21 by the central processing unit 164, the drive means for the rockable reflector mirror 70 is actuated to turn the mirror 70 to such an angular position under the control of the mirror drive control circuit 218.

After the rockable reflector mirror 70 is thus turned to the angular position enabling the photosensitive focus detector unit 84 to have its light sensitive area 232 of located centrally of the imaginary display area 230 in a vertical direction of the area 230, the automatic focus control central processing unit 164 starts execution of the focus control subroutine program B21 depicted in FIGS. 15A to 15D.

Figure 15A:
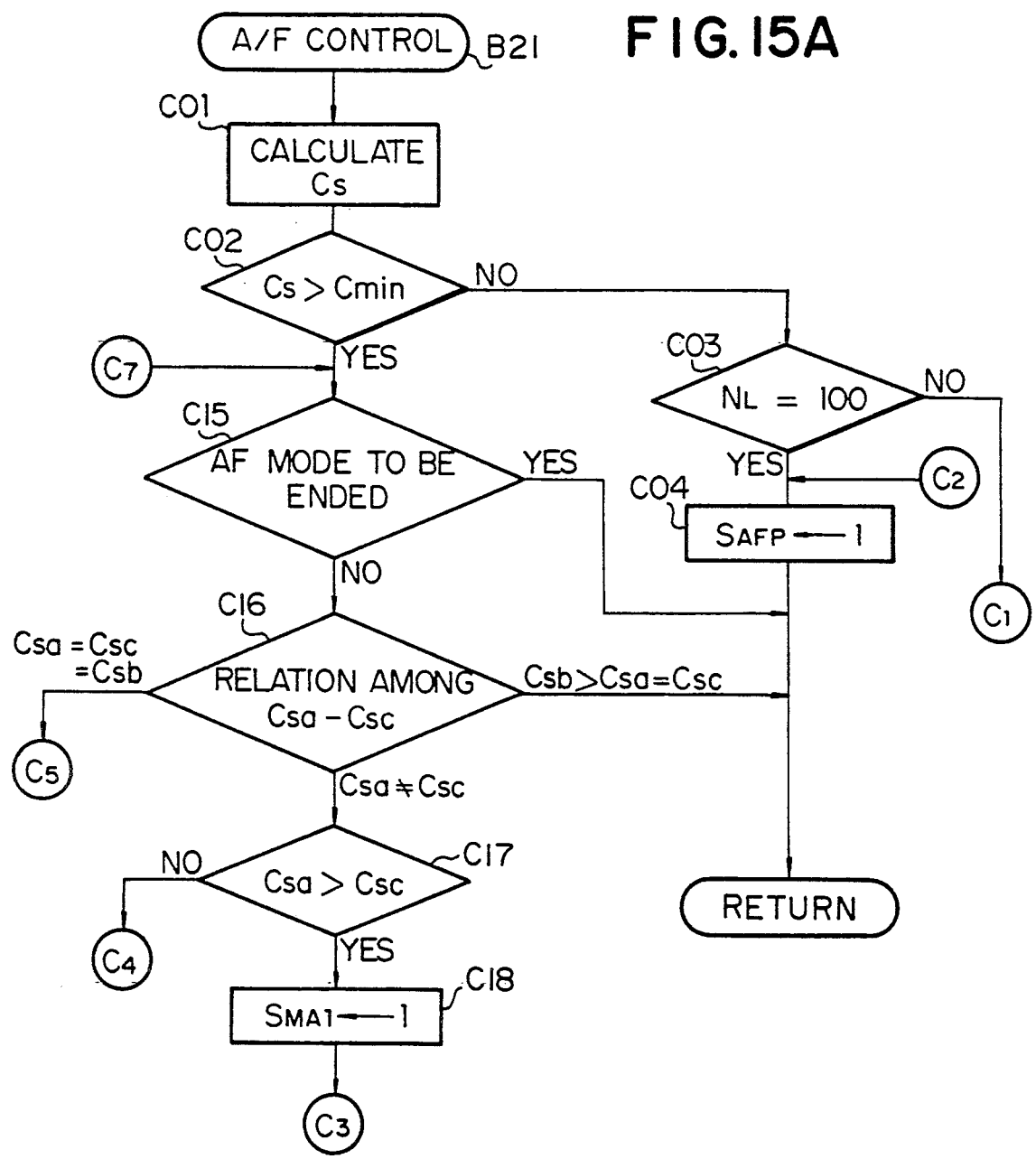
Figure 15C:
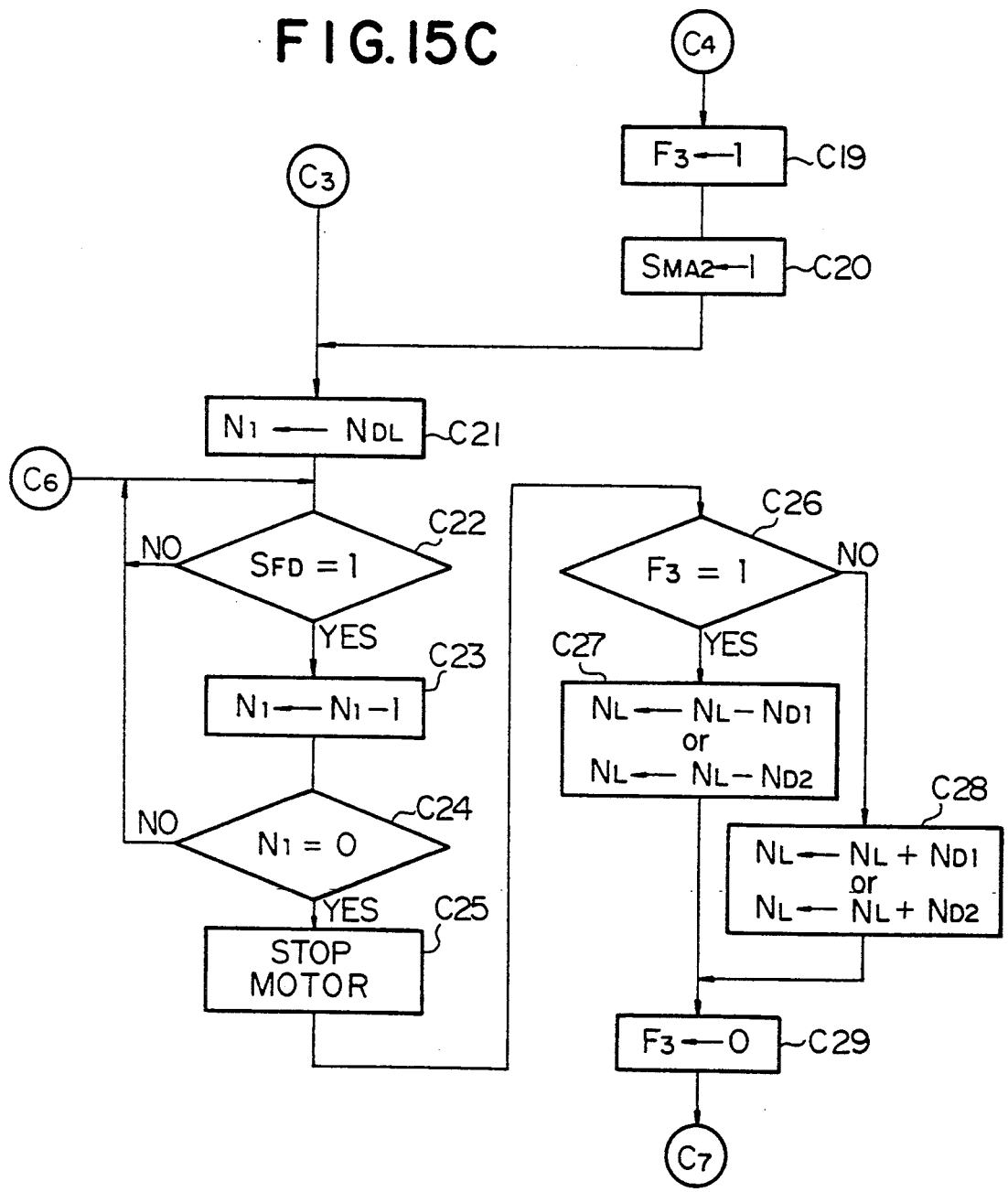
Figure 15D:
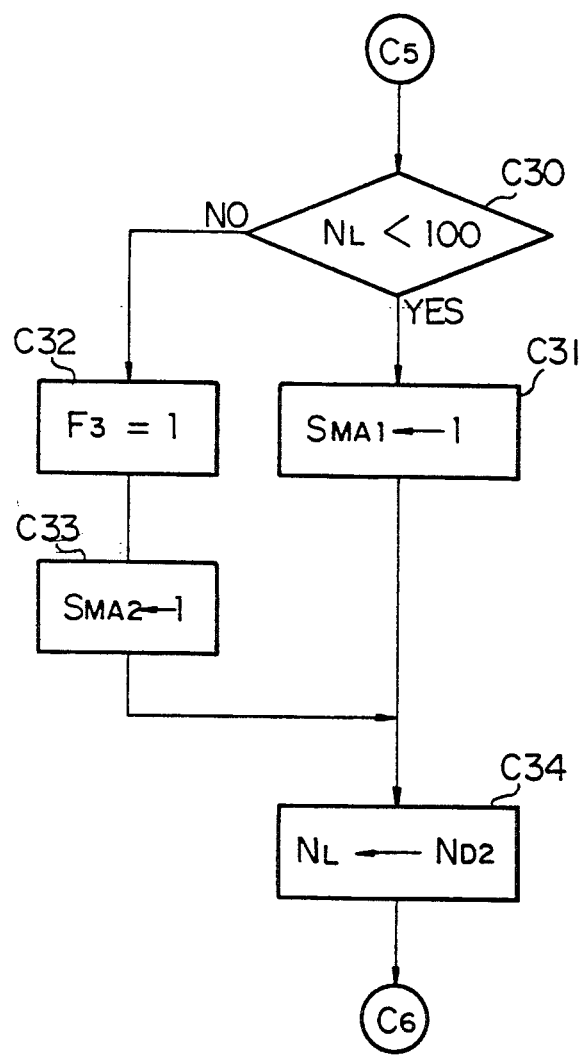

Referring first to FIG. 15A, the focus control subroutine program B21 starts with a step C01 to calculate the contrast $C_s$ of the image to result from the light incident on each of the first, second and third arrays 148, 150 and 152 of charge coupled devices in the photosensitive focus detector unit 84 shown in FIG. 7. From the signals $S_F$ supplied from each of the arrays 156, 158 and 160 of charge-coupled devices, the automatic focus control central processing unit 164 determines the maximum and minimum intensities $L_{max}$ and $L_{min}$ of the light incident on each CCD array and calculates from these values the image contrast $C_s$ for each CCD array in accordance with Eq. 1. The automatic focus control central processing unit 164 then calculates the image contrasts $C_{sa}$, $C_{sb}$ and $C_{sc}$ in respect of the first, second and third CCD arrays 156, 158 and 158, respectively, of the photosensitive focus detector unit 84. Each of these image contrasts $C_{sa}$, $C_{sb}$ and $C_{sc}$ is then compared at step C02 with a predetermined minimum image contrast $C_{min}$ stored in the memory 166.

If it is found at step C02 that every one of the image contrasts $C_{sa}$, $C_{sb}$ and $C_{sc}$ is less than the predetermined minimum image contrast $C_{min}$, the central processing unit 164 determines that there currently is no image detected by the photosensitive focus detector unit 84 or that the image currently detected by the detector unit 84 is too low in contrast to be automatically focus controlled. In this instance, the answer for the step C02 is given in the negative and the central processing unit 164 detects at step C03 whether or not the count $N_L$ of the pulses currently stored in the memory 168 is equal to the numerical value 100 indicating that the focusing lens element 68a forming part of the lens unit 68 is held in its axial home position having the focal plane located on the lower face 56a of the upper holder plate 56 (FIG. 14).

If it is found at step C03 that the currently valid count $N_L$ of pulses is equal to the numerical value 100, the central processing unit 164 determines that the automatic focusing operation could be performed with the focal plane of the focusing lens element 68a located on the lower face 56a of the holder plate 56 but the image currently detected by the detector unit 84 has a degree of contrast which is so low that the automatic focusing operation could not be performed. In this instance, the central processing unit 164 proceeds to step C04 to generate the automatic focusing mode prohibit signal $S_{AFP}$ indicating that the automatic mode of focus control is inoperable. Subsequently to step C04, the central processing unit 164 reverts to the routine program described with reference to FIG. 12 and may proceed to step B01. During the reiteration of the routine program of FIG. 12, the central processing unit 162 may proceed to the automatic focus control subroutine program B12. The central processing unit 162 may thus for a second time proceed to step C01 to calculate the image contrasts $C_{sa}$, $C_{sb}$ and $C_{sc}$ in respect of the first, second and third CCD arrays 156, 158 and 158, respectively, of the photosensitive focus detector unit 84.

The automatic focusing mode prohibit signal $S_{AFP}$ thus output from the central processing unit 164 is transferred through the bus 194 to the read/print control central processing unit 192 and is detected at step A23 of the routine program previously described with reference to FIGS. 11A to 11C. In response to the signal $S_{AFP}$, the read/print control central processing unit 192 sets the first control flag $F_1$ to logic "1" state and issues an instruction signal effective to turn on the indicator 48e on the control panel 42 to indicate that the automatic mode of focus control operation is currently inoperable.

On the other hand, if it is found at step C03 that the currently valid count $N_L$ of pulses is not equal to the numerical value 100, the central processing unit 164 determines that the automatic focusing operation could not be performed with the focal plane of the focusing lens element 68a located off the lower face 56a of the holder plate 56. In this instance, the central processing unit 164 proceeds to step C05 shown in FIG. 15B to detect whether or not the count $N_L$ of pulses currently stored in the memory 168 is less than the numerical value 100. If it is found at this step C05 that the currently valid count $N_L$ of pulses is less than the numerical value 100 and accordingly the answer for the step C05 is given in the affirmative, the central processing unit 164 proceeds to step C06 to generate the first motor actuation signal $S_{MA1}$ of logic "1" state effective to drive the focusing lens element 68a for axial movement in the first direction toward the microfiche F in place.

After the first motor actuation signal $S_{MA1}$ is thus generated and the focusing lens element 68a is driven for axial movement toward the microfiche F in place, the central processing unit 164 checks at step C07 if there is a new pulse of high level appearing in the pulse signal $S_{FD}$ supplied from the rotary-shaft encoder 150. The central processing unit 164 thus increments at step C08 the count $N_L$ of the pulses stored in the memory 168 when a new pulse is found appearing in the pulse signal $S_{FD}$ from the rotary-shaft encoder 64. The central processing unit 164 then checks at step C09 if the count $N_L$ of pulses currently stored in the memory 168 has reached the numerical value 100. If the answer for this step C09 is given in the affirmative, the central processing unit 164 determines that the focusing lens element 68a is held in its axial reference position having the focal plane located on the lower face 56a of the upper holder plate 56 (FIG. 14). In this instance, the central processing unit 164 proceeds to step C10 to generate an instruction signal to bring the focus control gear drive motor 148 to a full stop.

If it is found at step C09 that the currently valid count $N_L$ of pulses has not yet reached the numerical value 100, the central processing unit 164 reverts to step C07 and recycles the loop of the steps C07 to C09 until it is found at step C09 that the currently valid count $N_L$ of pulses has reached the numerical value 100. The central processing unit 164 then proceeds to step C10 to bring the focus control gear drive motor 148 to a full stop and thereafter proceeds to step C04 to generate the automatic focusing mode prohibit signal $S_{AFP}$ indicating that the automatic mode of focus control is inoperable.

If it is found at step C05 that the count $N_L$ of pulses currently stored in the memory 168 is less than the numerical value 100 and accordingly the answer for the step C05 is given in the negative, then the central processing unit 164 proceeds to step C11 to generate the second motor actuation signal $S_{MA2}$ of logic "1" state effective to drive the focusing lens element 68a for axial movement in the second direction away from the microfiche F in place.

After the second motor actuation signal $S_{MA2}$ is thus generated and the focusing lens element 68a is driven for axial movement away from the microfiche F in place, the central processing unit 164 checks at step C12 if there is a new pulse of high level appearing in the pulse signal $S_{FD}$ supplied from the rotary-shaft encoder 150. The central processing unit 164 thus decrements at step C13 the count $N_L$ of the pulses stored in the memory 168 when a new pulse is found appearing in the pulse signal $S_{FD}$ from the rotary-shaft encoder 64. The central processing unit 164 then checks at step C14 if the count $N_L$ of pulses currently stored in the memory 168 is reduced to the numerical value 100. If the answer for this step C14 is given in the affirmative, the central processing unit 164 determines that the focusing lens element 68a is held in its axial reference position having the focal plane located on the lower face 56a of the upper holder plate 56. In this instance, the central processing unit 164 proceeds to step C10 to generate an instruction signal to bring the focus control gear drive motor 148 to a full stop.

If it is found at step C14 that the currently valid count $N_L$ of pulses has not yet reached the numerical value 100, the central processing unit 164 reverts to step C12 and recycles the loop of the steps C12 to C14 until it is found at step C14 that the currently valid count $N_L$ of pulses has reached the numerical value 100. The central processing unit 164 then proceeds to step C10 to bring the focus control gear drive motor 148 to a full stop and thereafter proceeds to step C04 to generate the automatic focusing mode prohibit signal $S_{AFP}$. In response to this automatic focusing mode prohibit signal $S_{AFP}$, the read/print control central processing unit 192 issues at step A31 an instruction signal effective to turn on the indicator 48e to indicate that the automatic mode of focus control operation is currently inoperable. In this instance, the indicator 48e is turned on with an arrow indicating the direction in which the focusing lens element 68a of the projection lens unit 68 should be moved with respect to the microfiche F in place through manipulation by the manual focus control switch 48d on the control panel 42. In FIG. 2, such an arrow requires the operator to move the lens element 68a in the first direction toward the inner face 56a of the upper holder plate 56. Indicating the direction in which the lens element 68a should be moved by manual operation is useful for assisting the operator of the apparatus in manually adjusting the location of the focal plane of the focusing lens element 68a.

It will have been understood from the foregoing description that, when the image currently detected by the photosensitive focus detector unit 84 has a degree of contrast less than a predetermined minimum limit ($C_{min}$), it is determined by the central processing unit 164 that the automatic focusing operation could not be performed. In this instance, if it is found (at step C03) that the focal plane of the focusing lens element 68a is located on the lower face 56a of the holder plate 56, an automatic focusing mode prohibit signal $S_{AFP}$ of logic "1" state is immediately output from the central processing unit 164 and transferred to the read/print control central processing unit 192 (steps C04 and A23). The axial position of the focusing lens element 68a forming part of the projection lens unit 68 is adjusted through execution of the steps B02 to B10 of the routine program described with reference to FIG. 12 so that the focusing lens element 68a which has been once moved to the predetermined limit position thereof is moved to its axial reference position having the focal plane located on the lower face 56a of the upper holder plate 56.

If it is found (at step B11) that the manual focus control switch 48d is depressed on the control panel 42 of the apparatus, the focusing lens element 68a is moved through execution of the series of steps B11, B12, B13 to B16 and B10 or the series of steps B11, B12, B17 to B19, and B10 until it is determined by the operator of the apparatus that a correct focal plane is achieved by the lens element 68a. In this instance, it may be found that the focal plane of the lens element 68a is located slightly off the lower face 56a of the holder plate 56 (step C03). When it is thus detected that the focal plane of the lens element 68a is located slightly short of or beyond the lower face 56a of the holder plate 56 (step C05), the axial position of the focusing lens element 68a is readjusted through execution of the series of steps C06 to C09 and C10 or the series of steps C11 to C14 and C10 of the subroutine program B21 so that the focusing lens element 68a which has been once moved by manual focus control operation is moved to its axial reference position having the focal plane located on the lower face 56a of the upper holder plate 56.

It may be herein noted that the axial reference position of the focusing lens element 68a having its focal plane located on the lower face 56a of the holder plate 56 is merely a representative axial position of the lens element 68a having its focal plane located in practically acceptable relationship to the microfiche F in place. Thus, the reference position of the lens element 68a having its focal plane located in practically acceptable relationship to the microfiche F may be otherwise defined insofar as the location of the focal plane of the lens element 68a with respect to the microfiche F in place is such that will allow the automatic mode of focus control operation.

Turning back to FIG. 15A, if it is found at step C02 that none of the image contrasts $C_{sa}$, $C_{sb}$ and $C_{sc}$ calculated in respect to the first, second and third CCD arrays 156, 158 and 158, respectively, of the photosensitive focus detector unit 84 is less than the predetermined minimum image contrast $C_{min}$, the central processing unit 164 determines that the automatic mode of focus control operation can be performed properly. In this instance, the answer for the step C02 is given in the affirmative and the central processing unit 164 detects at step C15 whether or not an automatic focus control mode end signal effective to terminate the automatic mode of focus control operation is received from the read/print control central processing unit 192. This automatic focus control mode end signal is generated by the read/print control central processing unit 192 and is transmitted to the automatic focus control central processing unit 164 at step A25, A26, A27 or A27 of the routine program described with reference to FIGS. 11A to 11B. In the presence detected of such a signal, the automatic focus control central processing unit 164 no longer continues the execution of the automatic focus control subroutine program B21 and reverts to the routine program described with reference to FIG. 12.

If it is found at step C15 that there is no automatic focus control mode end signal received from the read/- print control central processing unit 192, the automatic focus control central processing unit 164 proceeds to step C16 to compare the image contrasts $C_{sa}$, $C_{sb}$ and $C_{sc}$ with one another to see (1) if the image contrasts $C_{sa}$ and $C_{sc}$ in respect of the first and third CCD arrays 156 and 158, respectively, of the photosensitive focus detector unit 84 are equal to each other, and (2) when the image contrasts $C_{sa}$ and $C_{sc}$ are equal to each other, if the image contrast $C_{sb}$ in respect of the second CCD array 158 of the detector unit 84 is equal to the image contrasts $C_{sa}$ and $C_{sc}$ in respect of the first and third CCD array 156 and 160.

If it is found at step C16 that the image contrasts $C_{sa}$ and $C_{sc}$ calculated in respect of the first and third CCD arrays 156 and 160, respectively, are equal to each other and the image contrast $C_{sb}$ is higher than the image contrasts $C_{sa}$ and $C_{sc}$, it is determined that the beam of light incident on the photosensitive focus detector unit 84 is correctly focussed as has been described with reference to FIG. 8B. In this instance, the central processing unit 164 need not continue the execution of the automatic focus control subroutine program B21 and reverts to the routine program described with reference to FIG. 12.

On the other hand, if it is found at step C16 that the image contrasts $C_{sa}$ and $C_{sc}$ calculated in respect of the first and third CCD arrays 156 and 160, respectively, are not equal to each other, the step C16 is followed by step C17 to check if the image contrast $C_{sa}$ calculated in respect of the first CCD array 156 is larger than the image contrast $C_{sc}$ calculated in respect of the third CCD array 160. If the answer for this step C17 is given in the affirmative, the central processing unit 164 determines that the beam of light incident on the photosensitive focus detector unit 84 is under-focussed as has been described with reference to FIG. 8A. In this instance, the central processing unit 164 proceeds to step C18 to generate the first motor actuation signal $S_{MA1}$ of logic "1" state effective to drive the focusing lens element 68a for axial movement in the first direction toward the microfiche F in place. On the other hand, if the answer for step C17 is given in the negative, the central processing unit 164 determines that the beam of light incident on the photosensitive focus detector unit 84 is over-focussed as has been described with reference to FIG. 8C. In this instance, the central processing unit 164 proceeds to step C19 shown in FIG. 15C to set a third control flag $F_3$ to logic "1" state and thereafter proceeds to step C20 to generate the second motor actuation signal $S_{MA2}$ of logic "1" state effective to drive the focusing lens element 68a for axial movement in the second direction away from the microfiche F in place. The third control flag $F_3$ set to logic "1" state at step C19 is indicative of the second direction of movement of the focusing lens element 68a.

Either the step C18 or step C20 is followed by step C21 through which the focus control gear drive motor 148 is controlled to drive the focusing lens element 68a to axially move a predetermined pitch distance dictated by a first pulse-count parameter $N_{D1}$ fetched from the memory 168. This pulse-count parameter $N_{D1}$ consists of a predetermined number of pulses and is indicative of a first predetermined pitch distance of movement of the focusing lens element 68a. The axial movement of the focusing lens element 68a thus driven for movement in the first or second direction toward or away from the microfiche F is monitored by the rotary-shaft encoder 150. At step C21, the pulse-count parameter $N_{D1}$ is registered into counter N1.

The central processing unit 164 now checks at step C22 if there is a new pulse of high level appearing in the pulse signal $S_{FD}$ supplied from the rotary-shaft encoder 150. The central processing unit 164 then decrements at step C23 the content of the counter N1 when a new pulse is found appearing in the pulse signal $S_{FD}$ from the rotary-shaft encoder 64. The central processing unit 164 thereafter checks at step C24 if the content of the counter N1 is reduced to a numerical value of 0. If the answer for this step C24 is given in the affirmative, the central processing unit 164 proceeds to step C25 to generate an instruction signal to bring the focus control gear drive motor 148 to a full stop. If it is found at step C24 that the content of the counter N1 is not yet reduced to the numerical value of 0, the central processing unit 164 reverts to step C22 and recycles the loop of the steps C22 to C24 until it is found at step C24 that the content of the counter N1 is reduced to the numerical value of 0. The central processing unit 164 then proceeds to step C25 to bring the focus control gear drive motor 148 to a full stop.

The central processing unit 164 then proceeds to step C26 to detect if the third control flag $F_3$ is set to logic "1" state indicating that the focusing lens element 68a is to be driven for movement in the second direction away from the microfiche F in place. If the answer for this step C26 is given in the affirmative, the step C26 is followed by step C27 at which the number of pulses forming the pulse-count parameter $N_{D1}$ fetched from the memory 168 at step C21 is deducted from the count $N_L$ of pulses currently stored in the memory 168. On the other hand, if the answer for this step C26 is given in the negative indicating that the focusing lens element 68a is to be driven for movement in the first direction toward the microfiche F, the step C26 is followed by step C28 at which the number of pulses forming the first pulse-count parameter $N_{D1}$ fetched from the memory 168 at step C21 is added to the count $N_L$ of pulses currently stored in the memory 168. After the count $N_L$ of pulses stored in the memory 168 is thus updated at step C27 or step C28, the central processing unit 162 proceeds to step C29 to reset the third control flag $F_3$ to logic "0" state.

Subsequently to step C29, the central processing unit 162 reverts to step C15 shown in FIG. 15A and may reiterate the series of steps including the step C18 or the steps C19 and C20 and terminating in the step C29 so that the focusing lens element 68a is repeatedly moved at a fixed pitch distance dictated by the first pulse-count parameter $N_{D1}$ stored in the memory 168 until it is found at step C15 that the beam of light incident on the photosensitive focus detector unit 84 is correctly focussed.

If it is found at step C16 that the image contrasts $C_{sa}$, $C_{sb}$ and $C_{sc}$ calculated in respect of the first, second and third CCD arrays 156, 158 and 160, respectively, are all equal to each other, it is determined that the image currently detected by the photosensitive focus detector unit 84 has a degree of contrast larger than a predetermined minimum limit ($C_{min}$), the beam of light incident on the photosensitive focus detector unit 84 is focussed at infinity so that the image incident on the viewing screen 38 will be out of focus. In this instance, the central processing unit 164 proceeds to step C30 shown in FIG. 15D to check if the count $N_L$ of pulses currently stored in the memory 168 is less than the predetermined value 100 indicating that the focal plane of the focusing lens element 68a is located on the lower face 56a of the upper holder plate 56 (FIG. 14).

If the answer for this step C30 is given in the affirmative, the central processing unit 164 determines that the beam of light incident on the photosensitive focus detector unit 84 is widely under-focussed. In this instance, the central processing unit 164 proceeds to step C31 to generate the first motor actuation signal $S_{MA1}$ of logic "1" state effective to drive the focusing lens element 68a for axial movement in the first direction toward the microfiche F in place. On the other hand, if the answer for step C30 is given in the negative, the central processing unit 164 determines that the beam of light incident on the photosensitive focus detector unit 84 is widely over-focussed. In this instance, the central processing unit 164 proceeds to step C19 to set the third control flag $F_3$ to logic "1" state and thereafter proceeds to step C33 to generate the first motor actuation signal $S_{MA1}$ of logic "1" state effective to drive the focusing lens element 68a for axial movement in the second direction away from the microfiche F in place. As has been noted, the third control flag $F_3$ set to logic "1" state at step C19 is indicative of the second direction of movement of the focusing lens element 68a.

Either the step C31 or step C33 is followed by step C34 through which the focus control gear drive motor 148 is controlled to drive the focusing lens element 68a to axially move a predetermined pitch distance dictated by a second pulse-count parameter $N_{D2}$ fetched from the memory 168. This second pulse-count parameter $N_D$ consists of a predetermined number of pulses stored in the memory 168 and is indicative of a second predetermined pitch distance of movement of the focusing lens element 68a. At step C34, the pulse-count parameter $N_{D2}$ is registered into the counter N1. Subsequently to step C34, the central processing unit 162 proceeds to step C22 and recycles the loop of the steps C22 to C24 until it is found at step C24 that the content of the counter N2 is reduced to the numerical value of 0.

The central processing unit 164 then proceeds to step C25 to bring the focus control gear drive motor 148 to a full stop and thereafter proceeds to step C26 to detect if the third control flag $F_3$ is set to logic "1" state indicating that the focusing lens element 68a is to be driven for movement in the second direction away from the microfiche F. If the answer for this step C26 is given in the affirmative, the step C26 is followed by step C27 at which the number of pulses forming the second pulse-count parameter $N_{D2}$ fetched from the memory 168 at step C34 is deducted from the count $N_L$ of pulses currently stored in the memory 168. On the other hand, if the answer for this step C26 is given in the negative indicating that the focusing lens element 68a is to be driven for movement in the first direction toward the microfiche F, the step C26 is followed by step C28 at which the number of pulses forming the second pulse-count parameter $N_{D2}$ fetched from the memory 168 at step C34 is added to the count $N_L$ of pulses currently stored in the memory 168. After the count $N_L$ of pulses stored in the memory 168 is thus updated at step C27 or step C28, the central processing unit 162 proceeds to step C29 to reset the third control flag $F_3$ to logic "0" state.

Subsequently to step C29, the central processing unit 162 reverts to step C15 shown in FIG. 15A and may reiterate the series of steps including the step C31 or the steps C32 and C33 and terminating in the step C29. The focusing lens element 68a is thus repeatedly moved at a fixed pitch distance dictated by the second pulse-count parameter $N_{D2}$ stored in the memory 168 until it is found at step C16 that the beam of light incident on the photosensitive focus detector unit 84 is correctly focussed or slight under-focussed or over-focussed.

While it has been assumed that the axial reference position of the focusing lens element 68a is fixed with respect to the microfiche F in place by the predetermined numerical value 100 of the count $N_L$ of pulses, the reference position of the focusing lens element 68a with respect to the microfiche F may be made adjustable by the use of a variable numerical value for the count $N_L$ of pulses for defining a particular reference position of the lens element 68a. The reference position of the focusing lens element 68a may be adjusted automatically depending on the unit angle through which the focus control gear 120 is to be driven to turn. Although, furthermore, each of the first and second pulse-count parameters $N_{D1}$ and $N_{D2}$ used in the control system of the described embodiment has been assumed to be indicative of a fixed distance of movement of the focusing lens element 68a, each of the parameters may be made variable depending on the signals $S_F$ output from the photosensitive focus detector unit 84 or, if desired, on other forms of information such as for example the de-focusing quantities to be determined in a detector unit of the phase-difference detecting type or on the degrees of contrast in a detector unit of the contrast detecting type.

While, in addition, the present invention has been described as being embodied in a microfilm reader/printer apparatus, it will be apparent that the gist of the present invention is readily applicable to, for example, an image processing apparatus using an image scanner adapted to optically scan images on an image-bearing medium.

What is claimed is:

1. A microfilm image reader for projecting an image of a microfilm onto a target plane, comprising:
   means for illuminating the microfilm for producing an image-bearing beam of light bearing the image of the microfilm;
   a projection lens for projecting said image-bearing beam of light onto said target plane;
   first detecting means for detecting a condition in which said image-bearing beam of light is focused with respect to said target plane;
   first focus control means responsive to the condition detected by said detecting means and operative to establish an automatic mode of focus control operation for automatically moving said projection lens to adjust the focal plane of the lens with respect to said target plane depending on the condition detected by said detecting means;
   second detecting means for detecting a condition in which the automatic mode of focus control is inoperable;
   second focus control means responsive to the condition detected by said second detecting means and operative to automatically move said projection lens to a position having its focal plane located on a predetermined plane with respect to said target plane when it is detected by said second detecting means that the automatic mode of focus control is inoperable;
   manual focus control means for permitting manual adjustment of the focal plane of said projection lens after the projection lens is moved to said position by said second automatic focus control means; and indicating means for indicating the direction in which said projection lens should be moved with respect to said target plane by said manual focus control means when said projection lens is moved to said position by said second focus control means.

2. A microfilm image reader as set forth in claim 1, in which said manual focus control means comprises manually operated signal input means for manually entering a signal requiring manual adjustment of the focal plane of said projection lens, said indicating means being located in proximity to said manual focus control means.

3. A microfilm image reader for projecting an image of a microfilm onto a target plane, comprising:

a projection lens having an optical axis therethrough and arranged to receive an image-bearing beam of the light bearing the image of the microfilm and project the image-bearing beam of the light therefrom;

first detecting means for detecting a condition in which said image-bearing beam of light is focused;

first focus control means responsive to the condition detected by said detecting means and operative to establish an automatic mode of focus control operation for automatically moving said projection lens in a direction parallel with the optical axis of said projection lens to adjust the focal plane of the lens depending on the condition detected by said detecting lens;

second detecting means for detecting a condition in which the automatic mode of focus control is inoperable;

second focus control means responsive to the condition detected by said second detecting means and operative to move said projection lens to a predetermined position with respect to said target plane when it is detected by said second detecting means that the automatic mode of focus control is inoperable;

manual focus control means for permitting manual adjustment of the focal plane of said projection lens after the projection lens is moved to said predetermined position by said second focus control means; and indicating means for indicating the direction in which said projection lens should be moved with respect to said target plane by said manual focus control means when said projection lens is moved to said predetermined position by said second focus control means.

4. A microfilm image reader as set forth in claim 3 in which said manual focus control means comprises manually operated signal input means for manually entering a signal requiring manual adjustment of the focal plane of said projection lens, said indicating means being located in proximity to said manual focus control means.

5. A microfilm image reader for projecting an image of a microfilm onto a target plane, comprising:

a projection lens having an optical axis therethrough and arranged to receive an image-bearing beam of the light bearing the image of the microfilm and project the image-bearing beam of the light therefrom;

holding means for holding the microfilm in place with respect to said projection lens;

first detecting means for detecting a condition in which said image-bearing beam of light is focussed;

first focus control means responsive to the condition detected by said detecting means and operative to establish an automatic mode of focus control operation for automatically moving said projection lens in a direction parallel with the optical axis of said projection lens to adjust the focal plane of the lens depending on the condition detected by said detecting lens;

second detecting means for detecting a condition in which the automatic mode of focus control is inoperable;

second focus control means responsive to the condition detected by said second detecting means and operative to move said projection lens to a predetermined position with respect to said microfilm when it is detected by said second detecting means that the automatic mode of focus control is inoperable; and manual focus control means for permitting manual adjustment of the focal plane of said projection lens after the projection lens is moved to said predetermined position by said second focus control means;

wherein said projection lens in said predetermined position is operative to project an image of a phantom microfilm located at or out of one limit of a range of distance within which the microfilm is allowed to be held in position by said holding means on the target plane in focus.

6. A microfilm image projecting apparatus for projecting an image recorded on a microfilm onto a target plane, comprising:

a projection lens for projecting an image-bearing beam of light bearing the image recorded on the microfilm onto the target plane, the projection lens having an optical axis therethrough, being exchangeable for another projection lens and movable in opposite directions parallel with said optical axis;

first detecting means for detecting the exchange of the projection lens;

lens positioning means which, when the exchange of the projection lens is detected by said first detecting means, is operative to move said projection lens to a predetermined position;

second detecting means for detecting a condition in which said image-bearing beam of light is focused with respect to said target plane; and automatic focus control means responsive to the condition detected by said second detecting means and operative to automatically move said projection lens from said predetermined position in a direction parallel with the optical axis of said projection lens to adjust the focal plane of the lens depending on the condition detected by said second detecting means.

7. A microfilm image projecting apparatus as set forth in claim 6, further comprising:

third detecting means for detecting a condition in which the automatic mode of automatic focus control means is inoperable; and lens position control means responsive to the condition detected by said third detecting means and operative to automatically move said projection lens to said predetermined position when it is detected by said second detecting means that the automatic mode of focus control is inoperable.

8. A microfilm image projecting apparatus as set forth in claim 7, further comprising indicating means for indicating the direction in which said projection lens should be moved with respect to said target plane by said manual focus control means when said projection lens is moved to said predetermined position by said lens position control means.

9. A microfilm image projecting apparatus as set forth in claim 8, further comprising indicating means for indicating the direction in which said projection lens should be moved with respect to said target plane by said manual focus control means when said projection lens is moved to said predetermined position by said lens position control means.

10. A microfilm image projecting apparatus as set forth in claim 9, in which said manual focus control means comprises manually operated signal input means for manually entering a signal requiring manual adjustment of the focal plane of said projection lens, said indicating means being located in proximity to said manual focus control means.

11. A microfilm image projecting apparatus as set forth in claim 8, further comprising means for holding a microfilm in place with respect to said projection lens while allowing the microfilm to move within a predetermined range of distance in a direction parallel with said optical axis, wherein said predetermined position is such that the projection lens projects an image of a phantom microfilm located at or out of one limit of said range of distance.

12. A microfilm image projecting apparatus as set forth in claim 8, further comprising holding means for holding a microfilm in place with respect to said projection lens, wherein said projection lens in said predetermined position is operative to project the image of the microfilm located at or out of one limit of a range of distance within which the microfilm is allowed to be held in position by holding means onto the target plane in focus.

13. An image projecting apparatus for projecting an image of an object located within a predetermined distance range from a target plane onto the target plane comprising:

an image projecting lens, which is movable along an optical axis thereof, for projecting an image-bearing beam onto the target plane;

auto-focus means for moving said image projecting lens along said optical axis so as to located said image projecting lens at an in-focus position where the image projecting lens projects the image-bearing beam onto the target plane in focus; and means for moving said image projecting lens to a predetermined out-of-focus position with respect to said in-focus position when said auto-focus means is inoperable, said out-of-focus position corresponding to a position of the image projecting lens where an image of a phantom object is focused on said target plane, said phantom object being located on one side of said object and substantially at a boundary of said predetermined distance range.

14. The image projecting apparatus of claim 13 further comprising:

means for manually focusing said image projecting lens, whereby said image projecting lens may be manually focused from a known direction relative to said in-focus position.

15. A method of adjusting a focal plane of an image projecting lens for projecting an image of an object located within a predetermined distance range from the image projecting lens comprising:

detecting a condition in which an image projected by the image projecting lens is focused;

establishing an automatic mode of focus control operation and moving said image projecting lens along an optical axis thereof responsive to aid detected condition to position said image projecting lens at an in-focus position where the image is projected in focus; and moving said image projecting lens to a predetermined position located at one side of said in-focus position in a direction of the optical axis, if said automatic focus control operation is inoperable, said predetermined position corresponding to a position of the image projecting lens where an object located substantially at a boundary of the predetermined distance range would be in-focus.

* * * * *